June 29, 1965    F. S. TOBEY    3,192,093
AUTOMATIC LABELING MACHINE
Filed Oct. 21, 1959    13 Sheets-Sheet 1

INVENTOR
FREDERIC S. TOBEY

BY

ATTORNEY

INVENTOR
FREDERIC S. TOBEY

BY

ATTORNEY

June 29, 1965  F. S. TOBEY  3,192,093
AUTOMATIC LABELING MACHINE
Filed Oct. 21, 1959  13 Sheets-Sheet 4

INVENTOR
FREDERIC S. TOBEY

BY

ATTORNEY

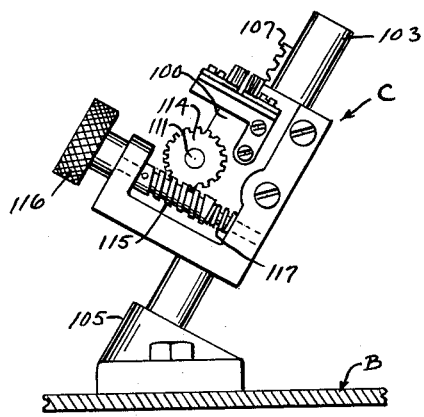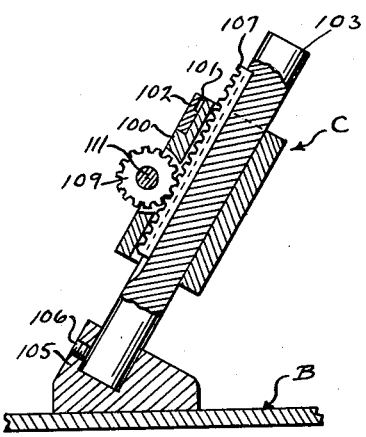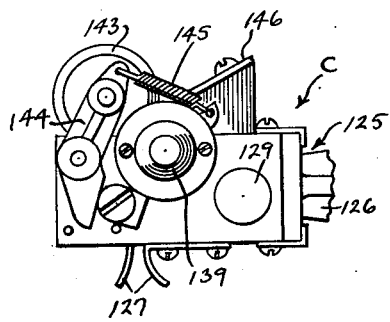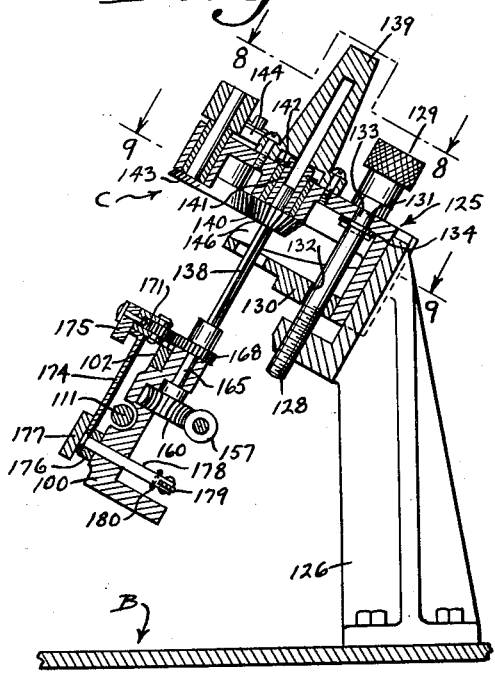

June 29, 1965 F. S. TOBEY 3,192,093
AUTOMATIC LABELING MACHINE
Filed Oct. 21, 1959 13 Sheets-Sheet 6

INVENTOR
FREDERIC S. TOBEY

BY
ATTORNEY

INVENTOR
FREDERIC S. TOBEY

BY

ATTORNEY

June 29, 1965   F. S. TOBEY   3,192,093
AUTOMATIC LABELING MACHINE
Filed Oct. 21, 1959   13 Sheets-Sheet 8
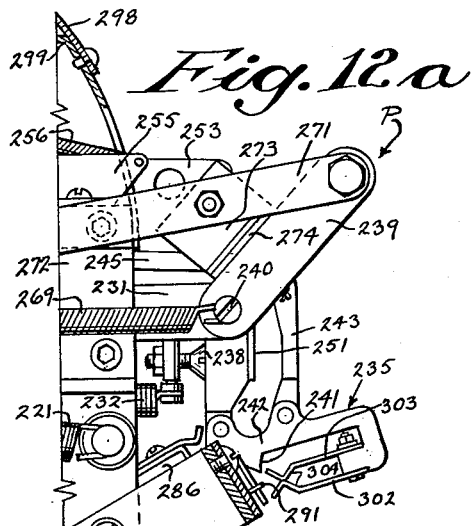
Fig. 12.a
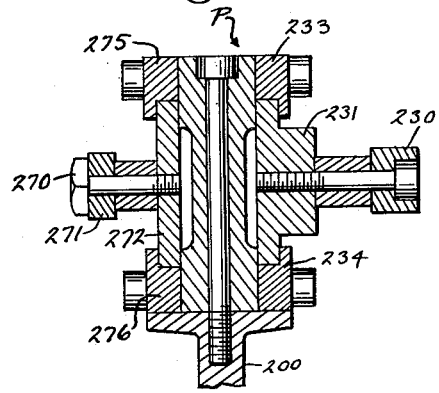
Fig. 13
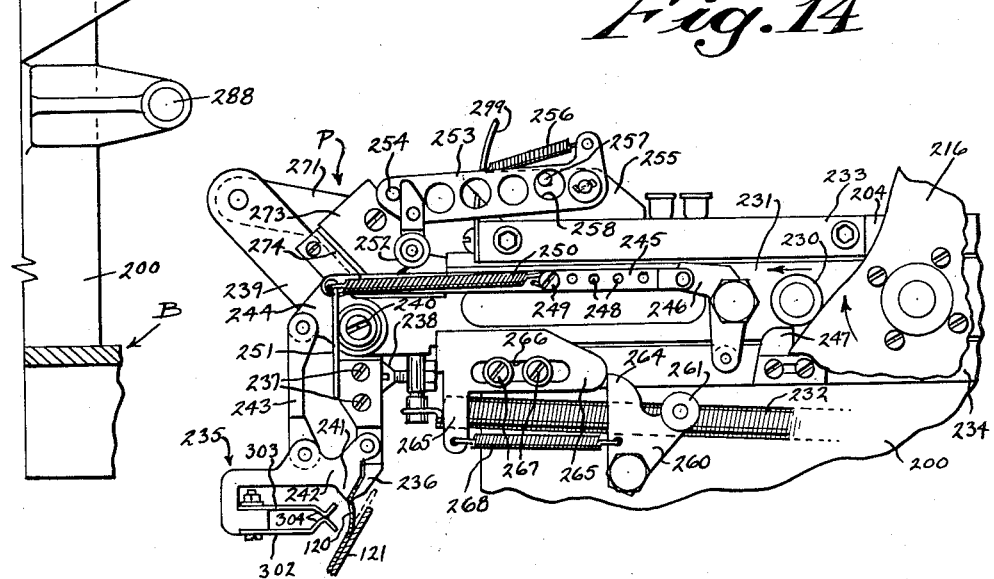
Fig. 14
INVENTOR
FREDERIC S. TOBEY
BY
ATTORNEY June 29, 1965 F. S. TOBEY 3,192,093
AUTOMATIC LABELING MACHINE
Filed Oct. 21, 1959 13 Sheets-Sheet 9
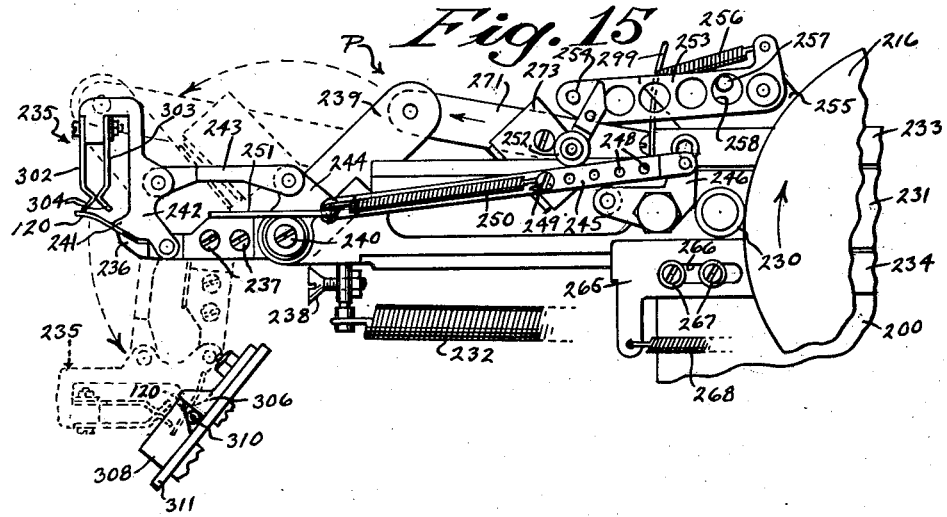
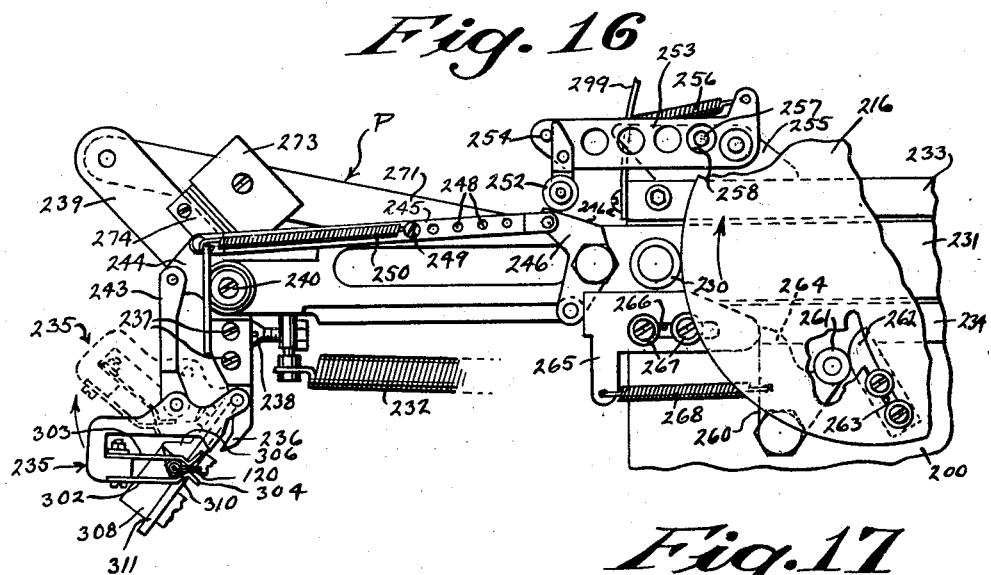
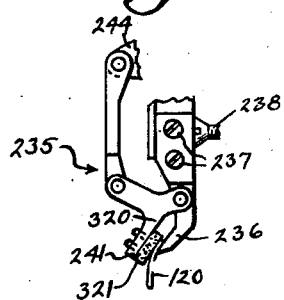
INVENTOR
FREDERIC S. TOBEY
BY
ATTORNEY

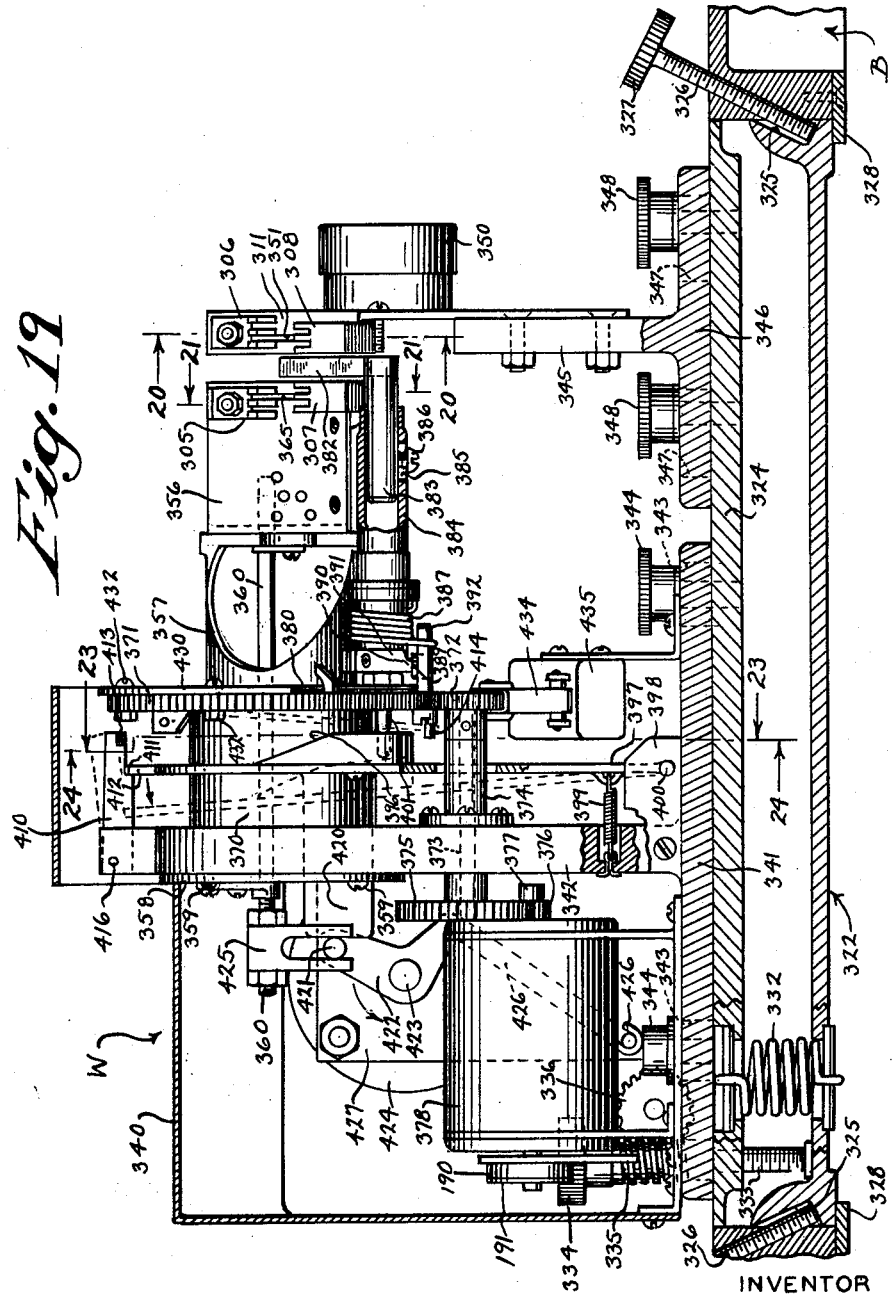

June 29, 1965   F. S. TOBEY   3,192,093
AUTOMATIC LABELING MACHINE
Filed Oct. 21, 1959   13 Sheets-Sheet 11

INVENTOR
FREDERIC S. TOBEY

BY
*Harold J. Erwin*

ATTORNEY

June 29, 1965  F. S. TOBEY  3,192,093
AUTOMATIC LABELING MACHINE
Filed Oct. 21, 1959  13 Sheets-Sheet 12

INVENTOR
FREDERIC S. TOBEY

BY

ATTORNEY

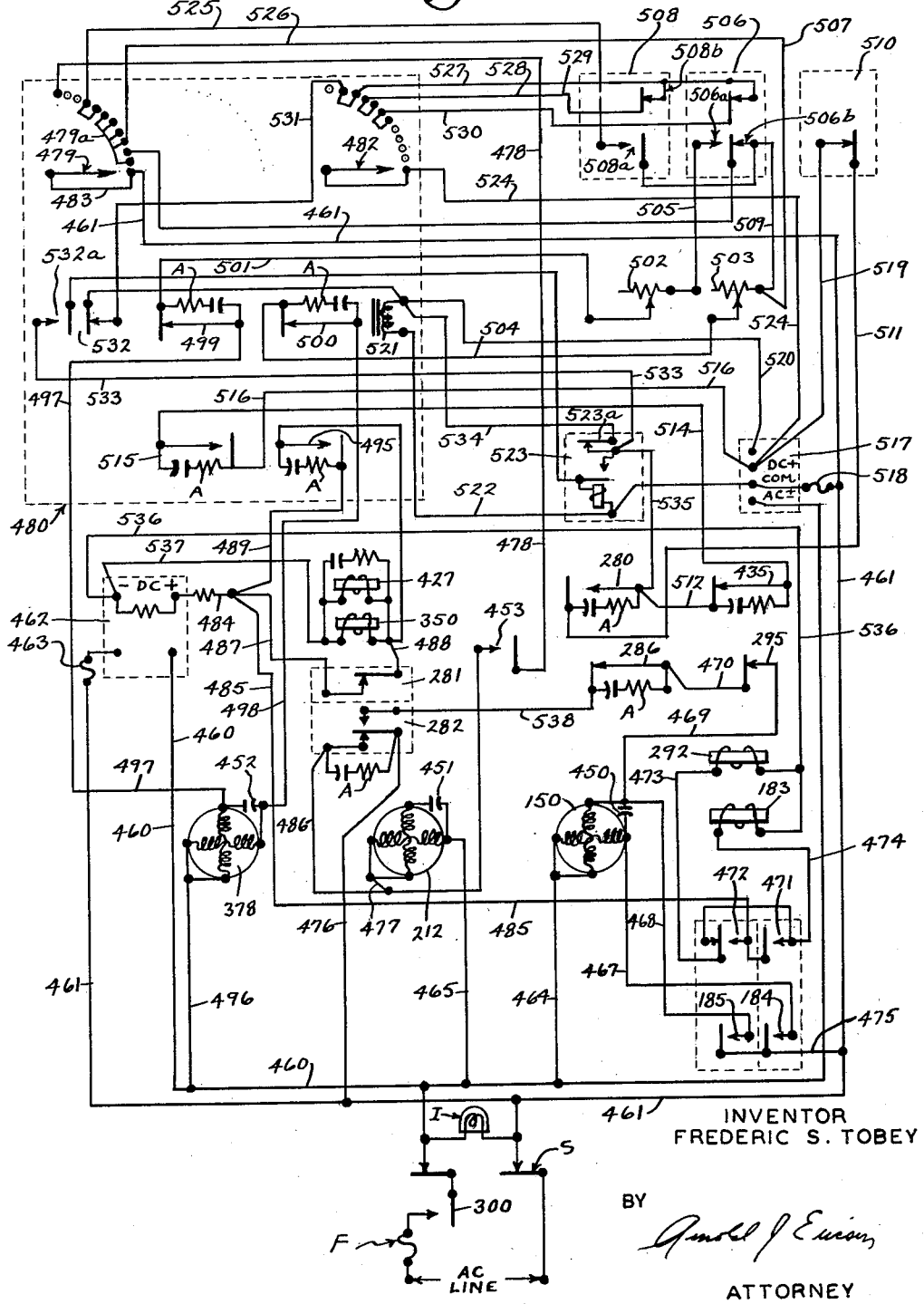

United States Patent Office 3,192,093
Patented June 29, 1965

3,192,093
AUTOMATIC LABELING MACHINE
Frederic S. Tobey, Walpole, Mass., assignor to W. H. Brady Co., Milwaukee, Wis., a corporation of Wisconsin
Filed Oct. 21, 1959, Ser. No. 847,739
11 Claims. (Cl. 156—359)

The present invention relates to a versatile labeling machine which is adaptable to a wide variety of work, including the marking of wires, wrapping of labels around small containers, wrapping insulation or labels around electronic components and the application of labels or markers to flat or uneven surfaces.

Pressure sensitive tapes and heat or solvent activated tapes have long been used for marking or coding wires, or as labels for various objects. It has been the usual practice to prepare the tape for mounting and to apply the same to an object by means of manual handling, and in the case of pressure-sensitive tapes, to remove the die-cut portion by hand from a protective backing material and to apply the piece by hand to the objects to which they are to be fixed. After removing the protective backing strip, the die-cut pieces are placed in contact with the object and pressed in place for engagement of the adhesive thereto. Heat sealable tapes require the additional step of applying a heated shoe or other heating device to the exposed label portion for activating the adhesive between the label and the object for contact therewith. Solvent activated tapes require the application of a solvent directly thereto. All of these operations have heretofore been accomplished by manual operation.

The present invention contemplates the provision of a versatile labeling machine, which machine includes subassembly components arranged to cooperate with one another or to operate independently, when desired, and when in cooperation with one another to provide a means of removing labels from a backing or liner supplied thereto, by peeling off a strip of the backing material to expose an edge of the labels, mechanically gripping a label at the exposed edge, peeling the remainder of the label from its backing material, applying the label to the object to which it is to be affixed, and finally, if necessary, following up with a separate pressing, wrapping or squeezing action. The machine of the present invention is particularly adaptable for use with adhesive label dispensers such as those described and claimed in Patent No. 2,434,545, granted to W. H. Brady, Jr. et al., on January 13, 1948. In dispenser cards of the type disclosed in the patent, pressure-sensitive adhesive labels are disposed in separable, pressure-sensitive adhesive contact with the dispenser mounting card composed of a thin layer of backing material having a predisposition to complete severance from the remainder of the card upon subjection to creasing along the line intersecting said series of labels close to one margin thereof, or which may be suitably scored along its length to permit separation and stripping of the backing with a marginal portion of the side-by-side arranged labels exposed for ease in peeling or otherwise removing the same from the remaining backing portion.

However, in the present machine all pressure-sensitive tapes may be dispensed, and a variety of backing materials, from heavy card to relatively flimsy paper, may be employed. The backing material is usually treated with a release coating to make removal of the tape easier.

The machine of the present invention preferably consists of four distinct units: the card feeding unit; the pickoff unit; wrapping unit and electrical unit. The first three units are preferably fastened to a main support or base, and the electrical unit is preferably separate therefrom, being connected to the main base only by a multiconductor electrical cable. Because of the absence of mechanical connection between the various units, the operation of the labeling machine can be varied at will by simply changing the position of switches on the separate electrical unit; no mechanical changes being necessary. The units are interlocked electrically so that they may perform their respective functions in the desired sequence, and are prevented by the electrical interlocks from operating except in that sequence, regardless of the actions of the operator of the machine. The cable connection permits the electrical unit to be remotely disposed relative to the other operating units, such as that of a shelf below the operating level, which in turn permits considerable reduction in space requirements for the mechanical operating components.

The individually operable units also permit accessory units to be attached to the machine. Such units conceivably may be an automatic card or dispenser feeding magazine which may be arranged to feed the cards or dispensers of pressure-sensitive tapes to the machine as needed. It is also possible to provide an unwind device for holding a roll of labels when it is preferable to furnish them in roll form, a rewind device for rolling up the surplus liner or backing material after the labels have been removed from the roll, heating devices for application of heat-sealing labels, and conveyor means for automatically feeding in objects to be labeled, etc.

The invention further consists of the several features hereinafter described and more particularly defined by the claims at the conclusion hereof.

In the drawings:
FIG. 1 is a top plan view of a wrapping machine of the present invention with portions of the protective guards or housings being removed for clearness of illustration;
FIGS. 2 and 2a, when positioned adjacent to one another, provide a sectional view taken along lines 2—2 of FIG. 1;
FIGS. 3–10, inclusive, are each illustrative of the various operating components of the card feeding unit portion of the machine, wherein FIG. 3 is a front elevational view of the unit with a dispenser card being shown assembled therein and taken in the plane of lines 3—3 of FIG. 2;
FIG. 4 is a top plan view of the card feeding unit omitting the dispenser backing strip remover 125;
FIG. 5 is a side elevational view taken from the right as viewed in FIGS. 3 and 4 omitting the dispenser backing strip remover 125 shown in FIG. 3 and the backing 121 with the labels 120 shown in FIGS. 3 and 4;
FIG. 6 is an elevational view, partly in section, taken in the plane of lines 6—6 of FIG. 3;
FIG. 7 is a vertical sectional view taken along the lines 7—7 of FIG. 3;
FIGS. 8 and 9 are detail views of a portion of the card feeding unit taken in the planes of lines 8—8 and 9—9 of FIG. 7, respectively;
FIG. 10 is a fragmentary sectional view taken along lines 10—10 of FIG. 3;
FIG. 11 is a vertical sectional view taken in the plane of lines 11—11 of FIG. 2, and particularly illustrating the relationship of the pickoff finger mechanism and a label dispenser card positioned relative thereto;
FIGS. 12 and 12a, when positioned adjacent to one another, present a vertical section of the pickoff unit taken along lines 12—12 of FIG. 11;
FIG. 13 is a fragmentary sectional view taken along lines 13—13 of FIG. 2a;
FIGS. 14–16, inclusive, are detailed fragmentary elevational views illustrating certain components of the pickoff unit shown in various cooperating positions relative to one another, FIG. 14 of which illustrates the relationship of the elements with the pickoff fingers engaging a label for removal thereof from a label dispenser card; FIG. 15 illustrates the main slide member being extended to full slide position and the pickoff fingers being shown in phantom view positioning a label or tape upon a wire and with a so-called "flagging" attachment being positioned just prior to application thereof to a wire; FIG. 16 illustrates the flagging attachment in flagging position with the label being applied directly to a wire with ends of the label protruding to form flagged ends;

FIG. 17 is a perspective view illustrating an insulated wire having a label or marking member applied thereto in "flagged" position;

FIG. 18 is a fragmentary side elevational view of another embodiment of a pickoff finger element for use in wrapping or other application wherein flagging is not required;

FIG. 19 is a fragmentary sectional view of the wrapping unit, which view is taken along the lines 19—19 of FIG. 1;

Figure 20:
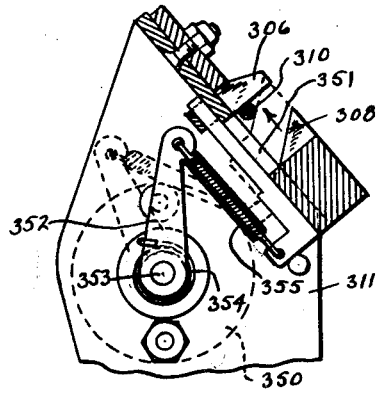
Figure 21:
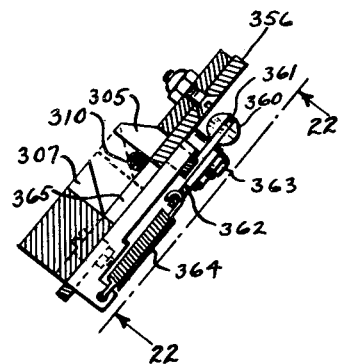
Figure 22:
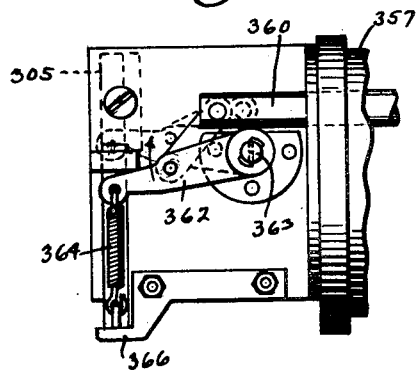
Figure 23:
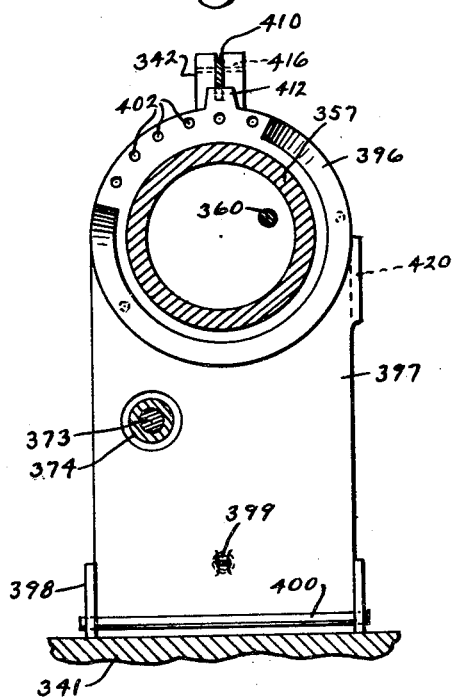
Figure 24:
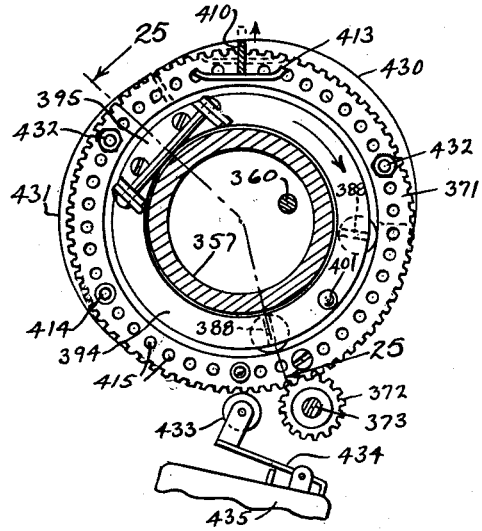
Figure 25:
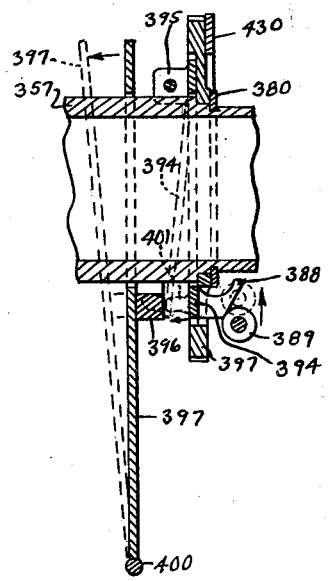
Figure 26:
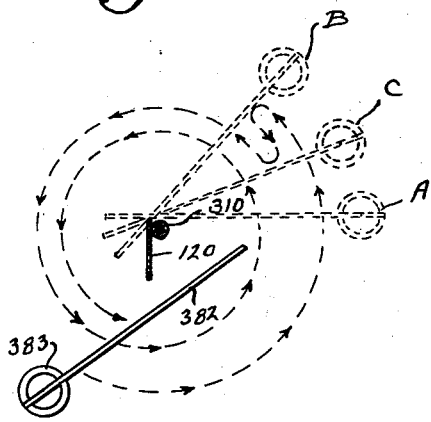
Figure 27:
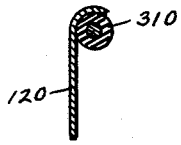
Figure 28:
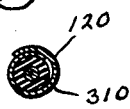

FIGS. 20 and 21 are fragmentary sectional views illustrating, in detail, the slidable jaw unit portions for holding an object to be labeled, such as an insulating wire, which views have been taken, respectively, along lines 20—20 and 21—21 of FIG. 19;

FIG. 22 is a fragmentary plan view taken in the plane of lines 22—22 of FIG. 21;

FIGS. 23 and 24 are each fragmentary sectional views illustrating details of the wrapping unit taken along lines 23—23 and 24—24 of FIG. 19, respectively;

FIG. 25 is a fragmentary sectional view illustrating other cooperating elements of the wrapping unit taken along lines 25—25 of FIG. 24;

FIG. 26 is a diagrammatic view of the various operating positions of the wrapping blade relative to a label and to an object to be labeled and illustrating its wrapping action;

FIG. 27 is a fragmentary cross sectional view of an insulated wire to be totally wrapped with a label or marker, and in particular, illustrating the first wrapping position of the label relative to the wire and prior to reversal of operation of the wrapping blade;

FIG. 28 is a cross sectional view of an insulated wire including a label or marker thereon completely wrapped about its periphery; and FIG. 29 is a diagrammatic view of the electrical circuit components providing the sequential operation of the various units.

Figure 1:
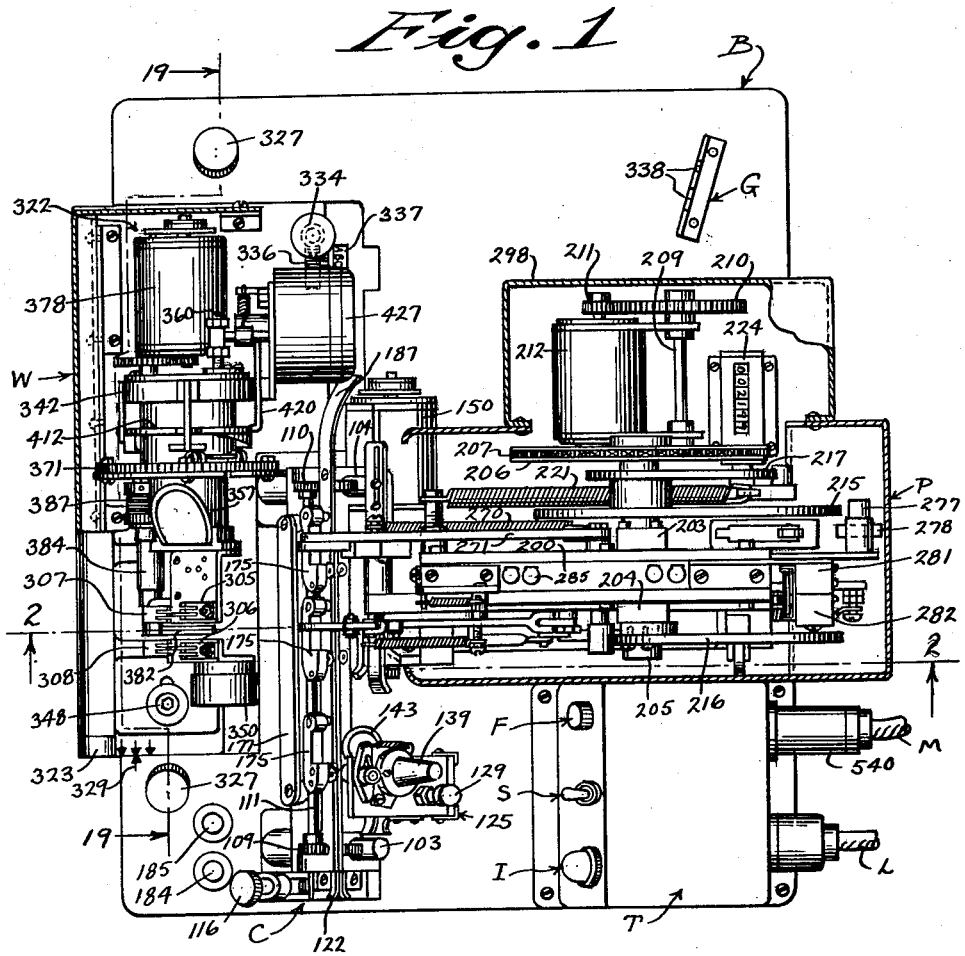
Figure 10:
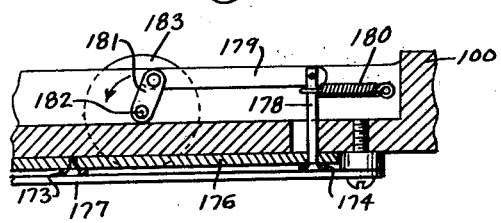

Referring to the plan view of FIG. 1, it will be observed that the various operating components of the preferred machine embodiment comprise a base B arranged to provide a support means for a card feeding unit C, a pickoff unit P, the wrapping unit W, a terminal and switch housing "T" and a thickness gauge G for measuring external surface dimensions of an object to be labeled and to serve as a guide for setting positions of the wrapping unit relative to the remaining components. The electrical unit is not particularly illustrated, but may comprise a simple box-like housing for the operating components contained therein, and being electrically connected to the labeling machine by means of a multi-conductor cable M. Power is supplied to the machine through the line L and is controlled by a master switch S with an indicator light I being provided to indicate that power is being supplied. The machine is appropriately protected by means of a removable fuse F positioned in the terminal housing T.

For purposes of simplicity in illustration and description the various units will be separately described and the card feeding unit C for removal and application of labels mounted on dispenser cards, such as those described and claimed in the aforementioned Patent No. 2,434,545, will be first discussed.

*Card feeding unit*

The card feeding unit C is more specifically illustrated in detail in the views of FIGS. 2–10, inclusive, and comprises an elongated grooved card supporting member 100, the groove 101 being smooth and of a depth and width suitable for containing and guiding the lower edge of a dispenser card or other backing 121 upon which labels 120 are mounted, but not deep enough to cover any part of the lower edge of the labels, as will hereinafter be described. The groove 101 may be provided by means of a removable coextensive guide strip 102 more clearly shown in FIG. 6. The card support member 100 is preferably arranged to be adjustable for height variations, and therefore includes apertures slidably receiving angularly disposed, spaced apart posts 103 and 104 secured to the base B by means of a releasable fitting 105 and maintained in place by means of a set screw 106. Each of the posts 103 and 104 are respectively provided with longitudinal rack elements 107 and 108, the teeth of which are arranged to mesh with pinions 109 and 110, respectively. The pinions 109 and 110 are affixed in axially spaced relationship to a rotatable shaft 111. The pinion shaft 111 is supported at its ends by means of trunnions 112 and 113 integral with the card support member 100, and may include a worm gear 114 affixed to a portion of the shaft extending beyond the trunnion 112. The worm gear 114 is engageable with a worm 115 terminating in a knurled height adjusting knob 116 (see FIG. 5). A biasing spring 117 surrounds the supporting shaft for the worm 115 and acts to provide continuous pressure against the knob 116 to prevent sloppiness in operation and to maintain the card supporting member 100 in the desired height position.

Figure 3:
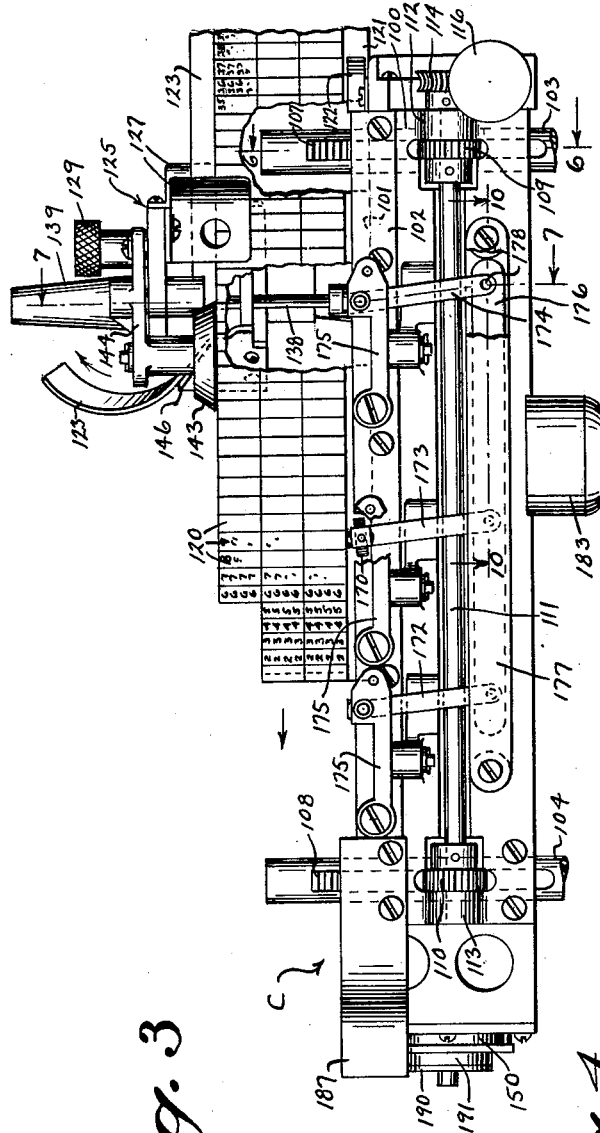

It will therefore be apparent that adjustment of the knob 116 will cause the card support member 100 to be raised or lowered relative to FIG. 3, as desired, to thereby permit any of several rows of labels 120 to be removed from a releasable dispenser card or backing 121. Several rows of labels 120 are illustrated in the view of FIG. 3, the uppermost row being presented for removal by the pickoff unit P, as will later be described. The right hand end of the support member 100 is arranged to initially receive the backing 121 between the relatively diverting guide fingers 122, either by hand insertion or by means of an automatically operated card loader (not shown).

As stated previously, the card feeding unit C is particularly adapted for use with dispenser backing 121, wherein the backing is scored or otherwise weakened along a line spaced from the margin thereof and within the margin of the uppermost label in order that a strip of backing material may be removed and permit access to the pressure sensitive label while allowing the labels to remain adhered to other backing material at their bottom edge. This arrangement prevents the tedious procedure of manually picking up a corner of a label by means of a fingernail or sharp object. Thus, the card feeding unit C is further provided with a dispenser backing strip remover, indicated generally by the reference character 125 and which may be mounted independently of the card support member 100 by means of the upright 126 secured to the base B.

The backing strip remover 125 preferably includes a pair of spaced apart divergent guide members 127 (see FIG. 9) for receiving the upper strip 123 of the dispenser backing 121 and are of sufficient width to permit guiding contact though the backing may be raised or lowered with respect thereto. The remover 125 is slidably received in the upright member 126 and is adjustable for height variations by means of the threaded bolt 128 engageable at one end thereof with a threaded opening in the upright 126, and having a knurled adjusting knob 129 at its opposite end. The bolt 128 is arranged to slidably receive the strip support element 130 at spaced apart openings 131 and 132, respectively. The bolt 128 is preferably provided with a shoulder 133, and is annularly grooved at a point axially spaced from the shoulder 133 to receive a retaining clip 134 therein to provide a relative slidable movement to the support element 130 and the stationary upright 126.

The strip support element 130 extends laterally from the upright 126 and is apertured for receiving a square or splined shaft 138 therein. A hollow conical protective member 139 is provided for protection of the shaft 138 when it is in its extended position upon lowering of the member 125 by means of the adjusting knob 129 and/or upon raising the card support member 100 on the posts 103 and 104 by means of adjustment of knob 116. Slidably mounted upon the shaft 138 is a knurled wheel, or friction drive member 140 which is retained in place by means of the rotatable tubular extension 141, which is annularly grooved at its uppermost end to receive the clip 142, and thereby hold the knurled wheel 140 with relation to the support member 130. The knurled wheel, or friction drive member 140 is arranged to cooperate with one side of the dispenser backing 121 which has its opposite side in frictional engagement with a cooperating beveled pinion member 143. Thus, rotation of the beveled member 140 provides a frictional gripping contact with the strip 123 of the backing 121 through the cooperation of the pinion 143 to provide lateral movement of the strip 123 therebetween, and as the backing 121 is concurrently moved in the groove 101, as will hereinafter be described. The beveled pinion 143 is preferably further biased in a direction towards the knurled wheel 140 by means of the spring 145 biasing lever 144 pivotally supporting the pinion 143 as disclosed in FIG. 8. Thus, as viewed in FIG. 9, the operation of the wheel 140 and the pinion 143 act to force the strip 123 three-through between the guide fingers 127 and past a diverting guide member 146 to the rear of the machine for later disposal. The mechanism for rotating the square or splined shaft 138 will hereinafter be described in connection with the remaining card feeding components.

The dispenser backing 121, when seated in groove 102 of the support member 100 is actuated in its forward movement (to the left as viewed in FIG. 3) by a novel means including spaced apart hardened and knurled cooperating wheels providing a pair of oppositely disposed frictional driving members arranged to frictionally engage opposite sides of the backing, and in their relative rotation provide a means of laterally moving the backing therebetween in desired opposed directions. Thus, with particular attention being directed to the view of FIG. 4, it will be apparent that the card feeding unit and the strip remover 125 are both operated from the same power source comprising the motor 150. The motors used throughout the various units of the present machine are preferably of a particular type having rotors of relatively small diameter and very little weight, and therefore of very low inertia, in addition to including the characteristic of developing maximum torque at zero speed. The reason for this feature will hereinafter be described, but for present purposes, the motor will be discussed only in connection with the operation of the card feeding unit elements.

Figure 4:
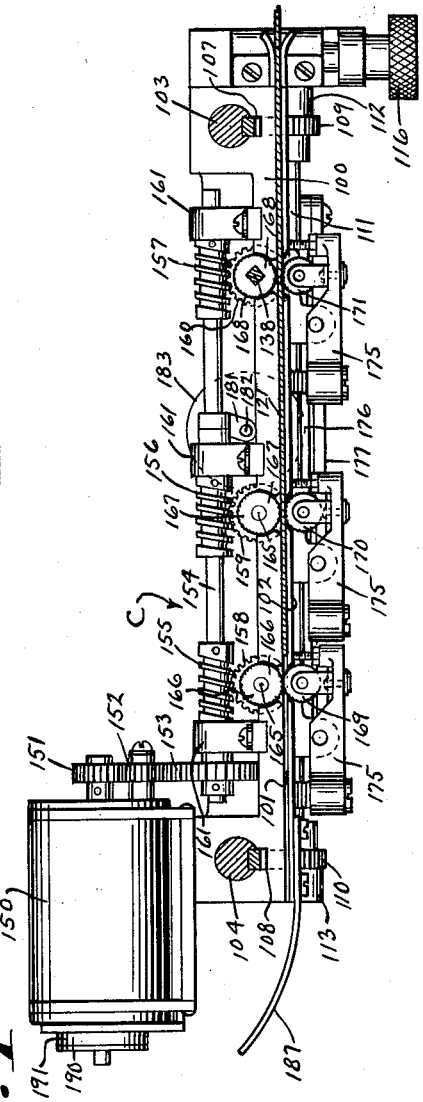

With reference to FIGS. 3 and 4, suitable speed reduction drive means may be provided in the form of a motor shaft mounted high speed gear 151, an intermediate gear 152 and a low speed gear 153. The low speed gear 153 is affixed to one end of a drive shaft 154, which in turn includes a plurality of axially spaced worm drive elements 155, 156 and 157 respectively meshing with worm gears 158, 159 and 160. The worm gear 160 is further arranged to drive the previously described square shaft 138 of the backing strip remover 125. Thus, for present purposes, the drive shaft 154 is arranged to drive three worm gear units, but more or less of these units may at times be desired depending upon length of dispenser backing. The drive shaft 154 is supported intermediate its ends by trunnion members 161 fastened to the card support member 100. Each of the worm gears 158, 159 are supported, as shown in FIG. 7, in a manner similar to the support of the worm gear 160, and each include a driven shaft 165 rotatably supported in a bore of the card support member 100 and terminating at its opposite end in the gear-like, or knurled wheels 166, 167 and 168, respectively. Oppositely disposed from each of the wheels 166, 167 and 168 are respective cooperating card drive pinion members 169, 170 and 171, which are respectively supported at the uppermost end of levers 172, 173 and 174. The said levers are each respectively pivotally supported at their uppermost ends by means of the outwardly extending support elements 175. The lowermost ends, as viewed in FIG. 3, of each of levers 172, 173 and 174 are pivotally joined, for tandem operation, to a longitudinally slidable rocker bar 176. A guard 177 is provided for the rocker bar 176. As best disclosed in FIG. 10, the rocker bar 176 is provided with a laterally extending pin 178 engageable at its opposite ends with a crank member 179 and is biased towards the right by means of the spring 180 anchored at the opposite end to the card support member 100. The crank 179 is pivotally attached, at its opposite end to a lever 181, which lever is secured to a shaft 182 extending from a rotary solenoid 183. It will be apparent that as a solenoid 183 is actuated through its electrical circuit, in a direction indicated by the arrow of FIG. 10, the rocker bar 176 will be moved by means of the pin 178 in a direction towards the left as viewed in FIG. 10. Such action provides a means of moving the card drive pinions 169, 170 and 171 on their pivotal support in a direction towards parallel alignment with one another and with the opposed respective knurled wheels 166, 167 and 168. During normal automatic operation of the card feeding unit C, the pinions 169, 170 and 171 are angularly disposed relative to the vertical, as shown in FIG. 3. It will thus be apparent that as the knurled wheels 166, 167 and 168 are rotated with their respective card drive pinions 169, 170 and 171 being angularly disposed relative thereto, a backing 121 seated therebetween will be caused to be driven in the forward direction of the arrow of FIG. 3, and at the same time, the angular arrangement will force the backing towards the bottom of the groove 101 as it is moved along. The backing will then be held in proper register with the groove 101 at all times and will have no tendency to ride upwardly from the groove. The solenoid 183 is actuated to move the rocker bar 176 and align the card drive pinions 169, 170, 171 when it is desired to reverse the action of the backing for various reasons, including selection of labels out of their usual sequence. Thus, on actuation of the reverse feed button 184 (see FIG. 1) the motor 150 will be reversed and the solenoid 183 will simultaneously be caused to actuate the rocker bar 176 and thereby permit the backing 121 to be reversed without being forced away from the groove as it would be if the pinions were permitted to be disposed in their usual angular relationship. The electrical circuitry connecting the reverse feed button with the solenoid 183 and the motor 150 for the operation of the card feeding unit C will be later described. A manually operated forward feed override button 185 is also provided when automatic operation is not desired as will later be described.

Figure 11:
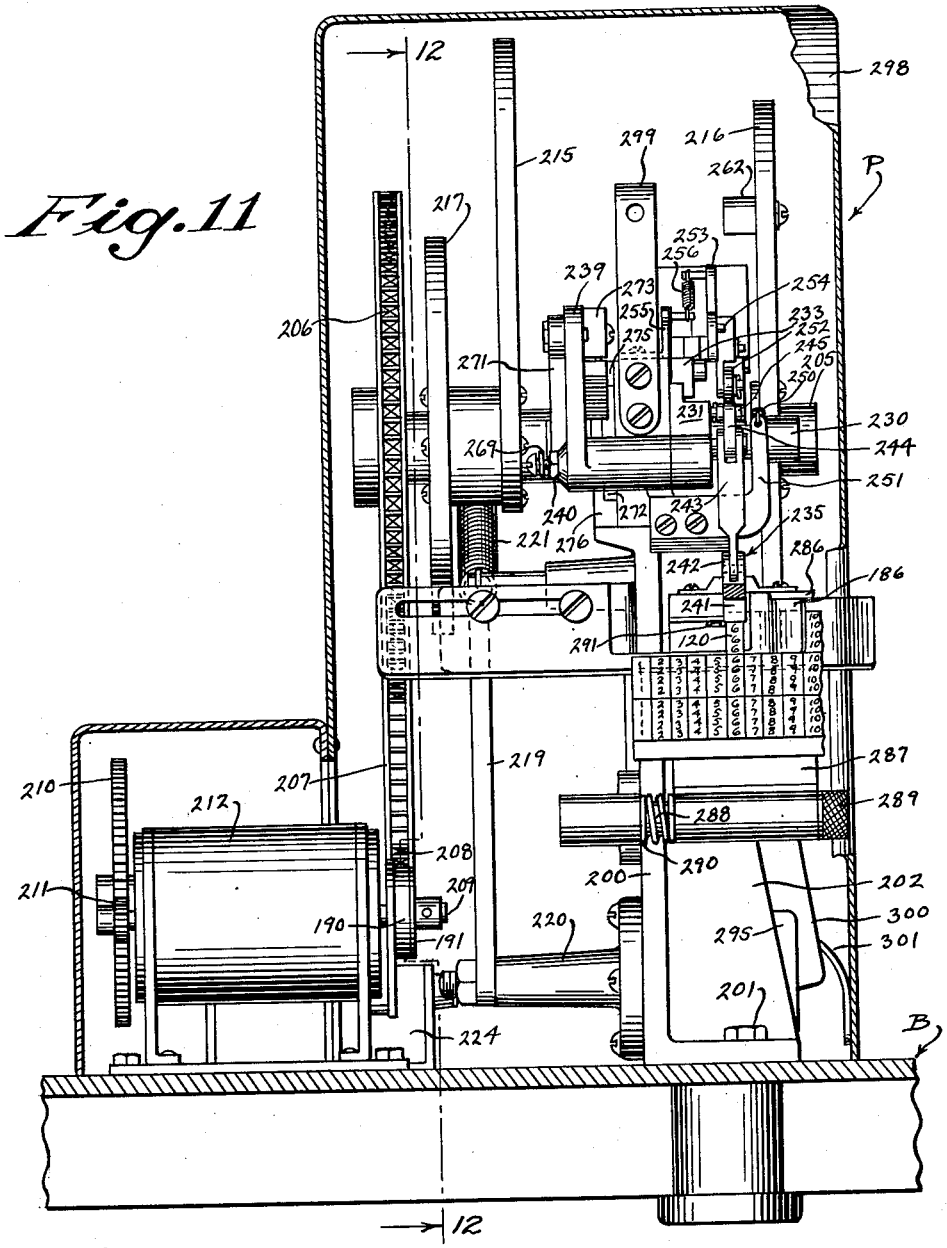

As shown in FIG. 11, the card feeding unit may include an additional guide finger 186 for registry of the labels with the pickoff unit P. An end guide 187, as shown in FIGS. 3 and 4, may also be provided to guide the backing 121 away from the operating components after it has passed through the pickoff station.

The operation of the card feeding unit C is as follows:

With the motor 150 of the card feeding unit C running, the electrical circuit of which will later be described, a backing 121 with labels 120 is introduced, either manually or automatically, into the groove 102 between the guide fingers 122. The first set of opposed knurled wheels 168 and 171 picks up the lower edge of the backing 121 and moves the card to the left, as viewed in FIG. 3, along the groove 101. As one of the pair of knurled wheels or pinions 171 is mounted at a slight angle, the backing will be held firmly down on the bottom of the groove 101 as it is moved along. Just as the knurled wheels 168 and 171 pick up the bottom edge of the backing 121, the pair of cooperating members, comprising the wheel 140 and the pinion 143 of the strip remover 125, pick up the top edge or backing strip 123 from the backing 121 and begin pulling it backward and upward at the same time, peeling it away from the upper part of the labels 120 and exposing the pressure-sensitive adhesive of the labels. As the backing 121 has previously been scored to provide the strip 123, this strip separates readily from the lower portion of the backing 121 and may be guided toward the rear of the machine by means of the guide 146, while the main part of the backing 121, with its labels 120 continues in its forward direction towards the pickoff unit P. After removal of the backing strip 123, the labels 120 in the upper row remain adhered at their bottom edge to unremoved backing strips (see FIG. 2). Means for automatically stopping the forward motion of the backing 121 is next provided, and this may preferably be mounted upon the pickoff unit P, which will next be described.

A word should be mentioned concerning another feature of the motor 150. That is, when the leading edge of the first label 120 on the backing 121 comes into contact with a switch arm to be later described, it opens the switch and shuts off the motor of the card feeding unit. It is necessary to brake the motor 150 in some manner so that it will stop as quickly as possible. Since it is a low-inertia motor, very little braking is necessary. The braking may be done dynamically or mechanically. To simplify the switching, the present invention contemplates mechanical braking, wherein a friction disc 190 is pinned to the end of the shaft of the motor 150, and a mating non-revoluble disc 191 is spring-loaded against it. The means for spring-loading is not shown herein, but this may be accomplished by means of a small compression spring (not shown) pressing against the mating disc 191 from within the motor housing to provide frictional contact between the discs 190 and 191. Thus, this brake will be engaged at all times. It provides a constant pre-load on the motor, and when the current is shut off it brings the motor very quickly to a stop and inhibits any tendency to "wander" thereafter. This method of braking is employed on all of the various motors used in the present labeling machine.

The pickoff unit P will next be described.

*Pickoff unit*

With reference to FIGS. 2 2a and 11-16, inclusive, the pickoff unit comprises a supporting stationary upright member 200, which may be in the form of an aluminum casting, and which is fastened to the base B by means of nuts 201 securing the laterally extending webbed portions 202 thereof to the base B. The web portions 202 are preferably spaced apart at opposite sides of the upright member 200. As shown in FIGS. 1 and 11 the upright member 200 includes spaced parallel bearing support members 203 and 204 at either side thereof having registering openings therein arranged to receive a cam shaft 205 extending from opposite sides thereof. The cam shaft 205 is driven in the direction shown by the arrow in FIG. 2a by means of a sprocket 206 affixed to one end thereof (see also FIG. 11) and engaging an endless sprocket chain 207 which in turn, is driven by a smaller sprocket 208 affixed to one end of a drive shaft 209, the opposite end of which supports a gear 210. Suitable speed reduction is provided by means of the gear 210 meshing with a nylon drive gear 211 affixed to the shaft of the motor 212. As before stated, the motor 212 includes the mechanical braking means in the form of the frictionally engaging discs 190 and 191.

Like parts on comparable elements of the various units are identified herein by like reference characters.

Figure 12:
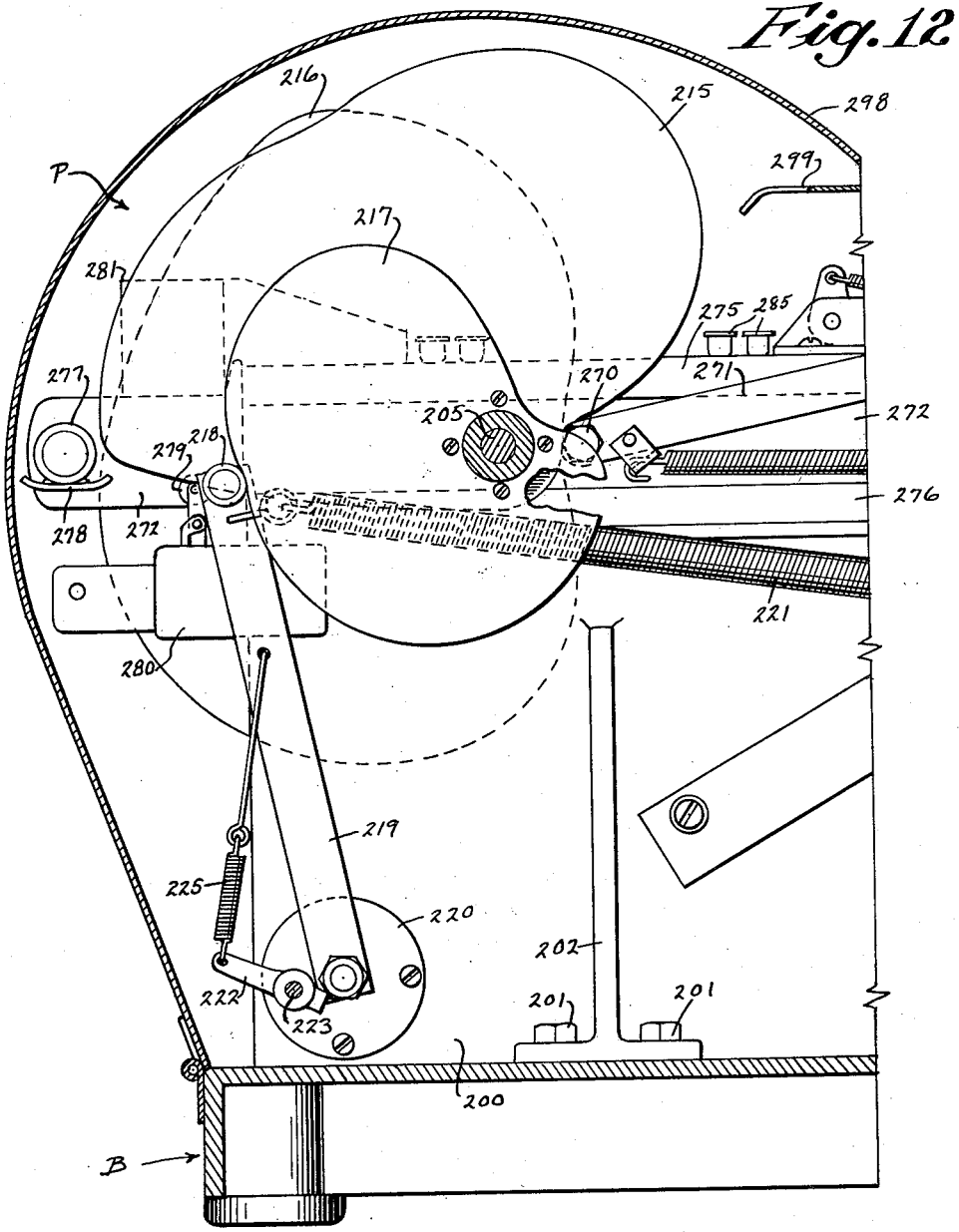

The electrical circuit supplying the motor 212 will later be described. The cam shaft 205 is arranged to fixedly support and to drive three external cam members, two of which serve to drive sliding members, and the third of which is provided to balance the forces of the other two. Thus, drive cams 215 and 216 are affixed on the shaft 205 at opposite sides of the upright 200 and the balancing cam 217 is affixed to the cam shaft 205 spaced outwardly of cam 215 as viewed in FIGS. 1 and 11. As indicated in FIG. 12, the cam lobes of the balancing cam 217 are external and contact only the cam follower or roller 218, which is rotatably affixed at one end to a lever arm 219 pivotally attached at its opposite end to a stationary bearing member 220 laterally extending from the upright 200. The roller end of the lever 219 is arranged to receive a tension spring 221 anchored at its opposite end to an extension of the upright 200 and arranged to urge the lever 219 in a clockwise direction as viewed in FIG. 12. A lever 222 is affixed to the shaft 223 of a counter member 224 when a counter is desired (see FIG. 1). A lost motion spring (see FIG. 12) is attached at one end to the lever 222 and at its opposite end to the cam lever 219 in order that every revolution of the cam may be counted when such counting is desired.

Each of the cam followers, as will hereinafter be described, of the sliding members are spring loaded against the drive cams 215 and 216, which spring loading would result in widely varying torque requirements in the drive shaft 205 at different points in the cycle. However, the third cam 217 is so contoured to balance, at each point in the cycle, the combined forces exerted by the other cams 215 and 216. The cam 217 is also spring loaded by means of the spring 221, and as a result of the contour and the latter mentioned spring loading, the torque requirement is approximately the same at all times.

In addition to the mechanical convenience of spring loading the cam followers, there is also a safety advantage in this method. If the labeling machine of the present invention is improperly loaded by the operator, or the settings are not correct for the job to be done, a collision may occur between the operating parts of the pickoff unit and some part of the wrapping unit, or the object to be labeled. If the operator places his finger in the wrapping unit while the machine is operating, the pickoff mechanism may strike it during its operation. In such case the forces, due to spring-loading, are substantially less than would otherwise be the case, and no serious injury or damage will result. This safety feature is in addition to the safety features built into the pickoff unit through the use of its low-inertia motor to drive it.

For simplicity of description and illustration, the pickoff finger mechanism will first be described in connection with an embodiment for "flagging" labels to wires. When labeling wires or other objects, especially if they are of very small diameter, it is often preferable to apply the labels so that part of it protrudes like a flag, instead of wrapping it completely around. Usually the two ends of a label are matched, so that no adhesive is exposed after the label is applied. The present machine is capable of labeling wires as fine as a human hair by means of flagging mechanism, whereas it would be impractical to attempt to wrap a label around anything that small. Furthermore, when a label is wrapped completely around an object of relatively small diameter (for example, less than $\frac{1}{16}$ inch diameter) the printing or other legend must be extremely small and is therefore difficult to read. On the other hand, when the label is "flagged" the printing may be as large as desired regardless of the object to which it is applied.

The pickoff fingers used for flagging are similar to those used for wrapping, and act to remove the label from the dispenser backing 121 in the same manner, but are provided with additional leaf spring members designed to squeeze the label around the wire or other object to be labeled as will hereinafter be described.

Figure 2:
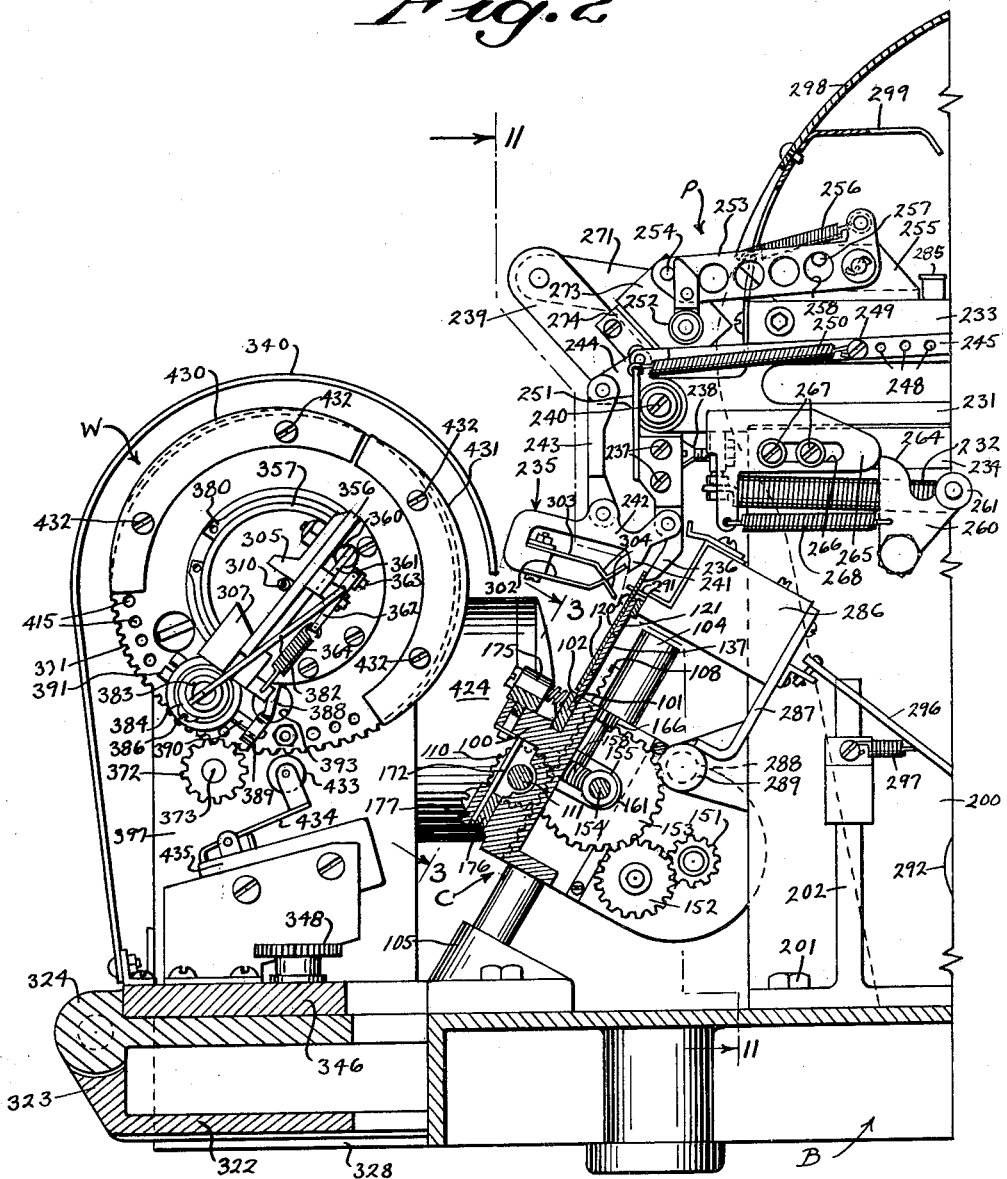
Figure 2A:
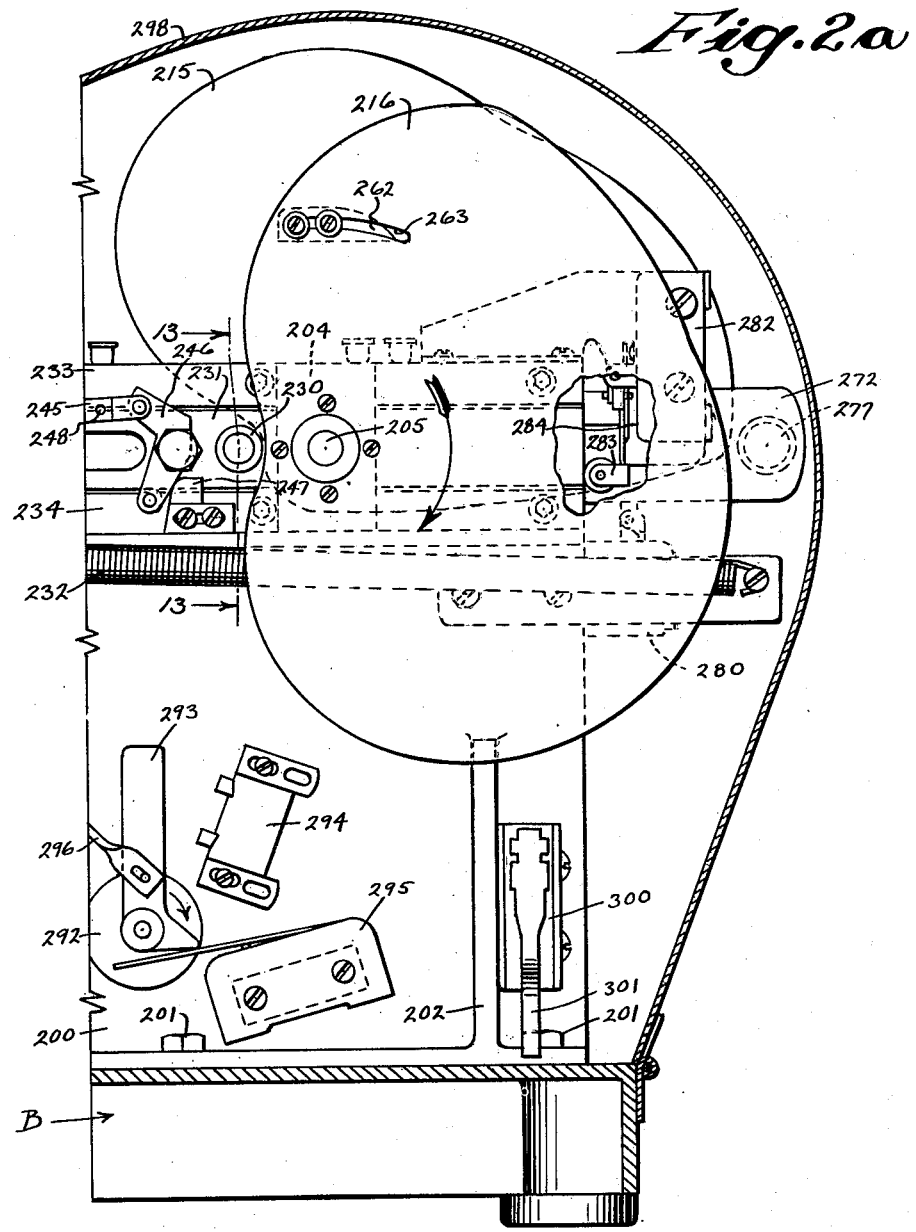

To proceed with the description of the pickoff unit P, the main drive cam 216 is shown in FIGS. 2 and 2a in its normal operating position prior to actuation of the motor 212 by means of a foot treadle or other operating switch to be later described. The cam 216 is of the external type, and revolves eccentrically about the axis of the drive shaft 205. The concave lobe portion of the cam 216 is indicated in FIG. 2a to be in the said normal position spaced slightly from the cam roller 230, which cam roller extends laterally from and is rotatably affixed to a main slide member 231. The main slide member 231 is returned to the retracted position of FIGS. 2 and 2a under the influence of the tension spring 232 which is attached at one end to the slide member and anchored at its opposite end to a stationary extending portion of the upright 200.

The main slide member 231 is slidably supported between parallel grooved slideways 233 and 234 (see also FIG. 13) secured to the top of the upright member 200. The slide 231 is equipped at its forward end with an interchangeable pickoff finger mechanism 235, which comprises a stationary pickoff finger 236, arranged at one end to removably pivotally secured to the main slide member 231 by means of screws 237 engaging tapped holes in a pivotally mounted crank 239 pivotally attached its ends to the slide 231 by means of the transverse screw 240. An adjustable stop in the form of screw 238 is provided as a rest for the finger 236 in its normal operating position for receiving the label 120, and acts as a positive stop for the slide member 231. Thus, because the slide member 231 is slightly spaced from the cam 216, when at rest, slight movement of the cam 216 will in no way effect the switch 282 to permit it to start the wrapping unit W, as will later be described. This is another built-in safety feature of the device. A movable pickoff finger 241 is arranged to be normally spaced from the stationary finger 236 to permit a label 120 to pass slidably therebetween from the card feeding unit C, and as shown in FIG. 2, is in position therebetween ready for removal from the backing 121. The movable pickoff finger 241 is actuated by means of a linkage comprising a lever 242 pivotally supported at one end by the upper portion of the stationary finger 236 and at a point intermediate its ends, spaced outwardly from the lever 239, to a link member 243. The opposite end of the link member 243 is pivotally attached to a lever 244 which is also pivoted at the screw 240 of the main slide member 231. The lever 244 is also pivotally attached to one end of an elongated link 245 having its opposite end engaging one arm of a crank 246. The crank 246 is pivotally attached to the main slide member 231 at a point spaced from its forward end. The opposite arm of the crank 246 normally rests against an adjustable cam surfaced stop 247 (see FIG. 2a), which stop is stationary with respect to the upright 200. The link 245 is provided with longitudinally spaced tapped openings 248 arranged to receive a removable anchoring screw 249, which in turn anchors one end of the tension spring 250. The opposite end of the spring 250 engages an extension 251 protruding from the upper end of the stationary finger 236. Thus, spring bias between the link 245 and the lever 239 may be adjusted by positioning the screw 249 in a selected one of the tapped openings 248. This bias is reflected in the pressure exerted between the pickoff fingers 236 and 241 to compensate for variations in the adhesive pull of different labels.

An additional biasing means of the finger 241 is provided through the linkage supporting the said finger, and comprises a roller member 252 pivotally suspended from one end of a crank 253, slightly spaced from the link 245, said crank 253 normally resting in the position shown in FIG. 2, against a protruding stop pin 254. The roller 252 is engageable with the upper cam surface 246a of the crank 246 as shown in FIG. 16, for purposes to be later described. The crank 253 is pivotally attached intermediate its ends to a bracket 255 secured to the upper surface of the upright 200. The opposite arm of the crank 253 provides an anchorage for the spring 256 tending to rotate the crank 253 in a counterclockwise direction from the position shown in FIG. 2. The opposite end of the spring 256 is anchored to an extending portion of the bracket 255. A protruding pin 257 is provided as a stop or rest for the crank 253 engaging an opening 258 therein.

With further reference to FIGS. 2 and 2a, it will be noted that the upright 200 further pivotally supports a lever 260 including a cam roller or follower 261 arranged to be engaged by an auxiliary cam lobe 262 (see also FIG. 11) which is adjustably secured in an arcuate slot 263 of the cam 216. Engagement of the auxiliary cam lobe 262 with the cam roller 261, is indicated in the view of FIG. 16. A pawl portion 264 of the lever 260 is arranged to normally engage the rearward cam surface of an auxiliary slide member 265, which is laterally slidable by means of its slot 266 received by the screws 267 secured to the upright 200. The auxiliary slide member 265 and the pawl 264 are biased towards engagement with one another and to the right, as viewed in FIG. 16, by means of the spring 268 anchored at opposite ends respectively to the slide 265 and to the lever 260.

The remaining components for actuation of the pickoff fingers (and in this case, the "flagging" mechanism) will now be described wherein the crank 239 is illustrated in its normal position pivoted on the screw 240 (see FIGS. 2 and 12a) at the forward end of the main slide 231, and is urged in a clockwise direction relative to FIG. 12a by means of the spring 269 anchored at one end to the crank 239 and at its opposite end at a point 270 intermediately of the ends of a link 271. The link is, in turn, pivotally secured to the crank 239 at one end, and to an auxiliary slide member 272 at its opposite end. A permanent magnet 273 is secured to the link 271, and is arranged to be in normal magnetic attachment to a bracket 274 of magnetic material mounted on the crank 239. In the present machine, most of the operating parts are of aluminum and require additional magnetically permeable means for operation with permanent magnets; however, if the parts should be made of iron or other magnetic material, obviously such auxiliary equipment is not necessary.

The opposite end of the link 271 (see FIGS. 12 and 13) is pivotally attached to an auxiliary slide member 272 slidably positioned between spaced apart, grooved slideways 275 and 276. The auxiliary slide member 272 is provided with a laterally extending cam roller 277 adapted for engagement with a convex lobe portion of the cam 215 for purposes hereinafter described. It will be observed from FIG. 12, that in normal positioning prior to actuation of the device, there is no contact between the roller 277 and the cam 215. A pawl 278 is affixed to the auxiliary slide member 272 and is arranged to engage a roller 279 on a switch arm of electrical switch 280 for purposes hereinafter described. Oiler plugs 285 are provided in the slideways 233 and 275 at laterally spaced positions for purposes of lubricating the slides 231 and 272 as desired. As aforementioned the balancing cam 217 in conjunction with the action of the spring 221 counterbalances the torque reaction forces of the cam actions of the respective cams 215 and 216. Referring again to FIGS. 1, 2 and 2a, two switch members 281 and 282 are provided for purposes hereinafter described, and are operated simultaneously by a roller actuated switch arm 283 engageable with the rearward end of the main slide 231, which arm is biased towards contact with the end of the slide 231 by means of a leaf spring 284.

The mechanism for automatically starting and stopping the dispenser backing 121 to position the labels 120 between the pickoff fingers 236 and 241 is preferably mounted on the pickoff unit P, but it is understood that it may be mounted directly to the card feeding unit or independently of both units if so desired. This mechanism comprises an electrical switch 286 mounted upon an adjustable bracket 287 (see FIGS. 2 and 11) which, in turn, is pivotally attached to a supporting shaft member 288. The shaft 288 terminates in a knurled adjusting screw 289, and at its opposite end is pressed or otherwise rigidly affixed to the upright 200. A biasing spring 290 normally urges the bracket 287 and switch 286 mounted thereon towards the right as viewed in FIG. 11. Alternative rotative adjustment of the screw 289 moves the switch 286 in opposed directions. The switch 286 is provided with a switch arm or pin 291 which moves from right to left as viewed in FIG. 11, and is actuated by the leading edge of the label 120 to thereby stop the operation of the card feeding unit C when the next label 120 to be removed has been positioned between the pickoff fingers 236 and 241. In order to center the label 120 between the pickoff fingers, it will be apparent that a slight adjustment of the knurled knob 289 will permit the bracket 287 and the switch 286 to be moved in opposite directions relative to the fingers 236 and 241.

Means are also provided for retracting the switch 286 from the position shown in FIGS. 2 and 11 to permit the dispenser backing 121 to be moved by manual depression of the buttons 184 and 185 without interference with the switch arm or pin 291. That is, upon actuation of either the forward or reverse feed buttons 184 or 185, the switch 286 and its bracket 287 will be simultaneously rocked in a clockwise direction relative to FIG. 2 to retract the pin 291 away from the leading edge of the label 120. The retracting means comprises a rotary solenoid 292 arranged to rotate a shaft mounted crank 293 of magnetic material in a direction towards engagement with a permanent magnet 294. The opposite arm of the crank 293 is arranged to actuate a switch blade of a switch 295. The crank 293 is mechanically connected to the switch bracket 287 by means of the link 296, and is normally maintained for automatic operating position, as shown in FIG. 2, by the bias of the spring 297 anchored to the link 296 and to the web 202 of the upright 200.

A protective housing 298 is provided for the pickoff unit P, and is pivotally attached at the rear of the base B at its lower end and aranged for locking closed position, shown in FIGS. 2 and 2a, by means of the resilient latching pawl 299 engageable therewith. An interlock switch 300 is mounted on the upright 200 and is provided with a switch blade 301 engageable with the inner side of the housing 298 and is arranged to be actuated by the movement of the housing 298 towards closed position for closing the contacts thereof for operation of the unit. When the housing 298 is moved to open position (not shown), the switch 300 will be opened to break the circuit and prevent an operator from being injured by contact with the moving parts should he accidentally trip a foot treadle operating switch, hereinafter described.

The pickoff finger mechanism 235, as shown in the present embodiment, is adapted for "flagging" labels 120 on an object, such as an insulated wire held at a position laterally spaced therefrom. The flagging attachment provides a pair of spaced cooperating leaf springs 302 and 303, each including a V-shaped terminus 304 normally in engaging contact with one another and arranged to be separated upon contact with a wire or other object to be flagged therewith.

For present purposes of describing the flagging attachment, only the holding means of the wrapping unit W, arranged for holding a wire or similar object to be flagged with a label 120, will be described. The wire holding unit comprises two pairs of relatively slidable jaw members each comprising laterally spaced stationary jaws 305 and 306 (see FIG. 1), each stationary jaw being respectively arranged to coact with slidable or movable jaw members 307 and 308, and thereby retain an object such as an insulated wire 310 (see FIGS. 15 and 16) therebetween and resting against a base support 311.

Thus, assuming that a wire 310 or similar object to be "flagged" with a label 120, as shown in FIG. 17, is disposed between the jaw members 305–308, and is maintained in place therebetween, the operation of the pickoff unit P will next be described, and with particular attention being directed to the "flagging" operation. The "wrapping" operation and the mechanism therefor will later be described.

Upon actuation of the pickoff unit motor 212 by means of a foot treadle or other circuit closure means, the main slide 231 will be caused to move forwardly of the "rest" position indicated in FIGS. 2 and 2a upon rotation of the cam 216 about the shaft 205, the external cam lobes of the cam engaging the roller 230 of the main slide 231 and thereby slidably move it forwardly between the ways 233 and 234. As the main slide 231 starts forward, the fingers 236 and 241 are caused to close and grip the previously positioned label 120 therebetween, as shown in FIG. 14. The closing of the pickoff fingers is accomplished by means of the action of the spring 250 acting upon its connected link 245 and its pivotally connected lever 244, as the main slide 241 moves in the said forward direction. The movable finger 241 also pivotally connected to the lever 244 through the medium of link 243 will be caused to close against the label 120 and the finger 236. The movement of the link 245 under the influence of spring 250 is permitted upon release of the arm of lever 246 from engagement with the stop or cam 247 as the main slide 231 carries the lever 246 therewith in its forward movement. Actually, the fingers will close as the slide 231 moves through approximately its first 1/16 inch of travel. The arrangement later provides a means of opening the fingers as the main slide 231 returns to its "rest" position with the stationary stop or cam 247 contacting and urging the lever 246 back to the position in FIG. 2a.

As the fingers 236 and 241 close upon the top edge of the label 120 and continue to move forward with the slide 231, the label 120 is progressively peeled from the dispenser backing 121. The angular position of the label 120 and the remaining portion of the backing 121 with respect to the pickoff fingers is such that the peeling action is similar to that which a human operator would employ in manually removing a label from the backing 121. The spring 250 mentioned previously is adjustable by movement of its anchoring screw 249 into the threaded openings 248, to provide varying pressures in the pickoff fingers to compensate for variations in the adhesive pull of different labels.

As the pickoff fingers 236 and 241, with the label 120 being held therebetween, continue to move in a forward direction with the main slide 231, the two drive cams 215 and 216, and their respective slides 231 and 272, interacting with each other, rotatably force the lever 239 from magnetic engagement with the permanent magnet 273 and raise the pickoff finger mechanism 235 up and over the object, such as the wire 310 to be labeled (solid line position of FIG. 15); then lower them again when the object has been passed (phantom line position of FIG. 15).

The positioning action of the mechanism 235 relative to the object, such as the wire 310, is illustrated with reference to the progressive steps illustrated in FIGS. 2, 2a, 14, 15 and 16. As stated previously, FIG. 14 shows the label 120 being removed from the backing 121, the slide 231 having started its forward movement. As the main slide member continues to move forwardly in its slideways 233 and 234, the protruding lobe portion of the drive cam 215 will engage the roller 277 (disclosed in non-engaged relationship in FIG. 12) of the auxiliary slide 272 to retard it in its forward progress and thereby act to cause the link 271 to remain relatively stationary or return to its original position and thereby force the crank 239 to rotate about its pivot and be released from the permanent magnet 273, as aforementioned, and thereby lift the mechanism 235 over the top of the object to be flagged, such as the wire 310. As the pickoff finger mechanism 235 passes over the object 310, the cam 215 will have been rotated to permit a lobe of lesser radial dimension to contact the roller 277 and thereby to again permit the crank 239 to rotate in a counterclockwise direction and drop the mechanism 235 downwardly to the phantom position shown in FIG. 15. Subsequent movement of the cam 216 causes the pickoff finger mechanism 235 to move the spring fingers 302 and 303 forwardly to "flag" the wire 310 with the label 120 by means of the relative inward bias of the V-shaped portions 304.

The cam 216 will then have substantially completed its cycle, to arrive at a dead or neutral spot in its periphrey to provide a dwell period which has particular application during wrapping operation. The dwell period permits the pressure sensitive label to adhere to the wire, as it is known that, in addition to pressure, adhesives of this nature also require a period of dwell for proper adherence. This problem is of no particular concern during flagging operation, but becomes important for wrapping, as will later be discussed. However, the dead or neutral period, which amounts to about 30 degrees of cam travel, also provides time for the cam surface of the auxiliary cam 262 to engage its follower roller 261 (see FIG. 16). This engagement acts to raise the pickoff fingers and retract the flagging springs 302 and 303 from the wire 310, prior to the return of the slide 231 (shown in phantom in FIG. 16). This is accomplished by means of forward sliding movement of the auxiliary slide 265, actuated by the lever 264 upon contact of the follower 261 with the cam lobe 262. The forward sliding action of the slide 265 actuates the link 245 by means of engagement with the crank 246.

The slide 231 is returned to rest position by the action of the main spring 232. The slide is at rest, as shown in FIGS. 2 and 2a, with the finger 236 resting against the adjustable stop screw 238.

After the main slide 231 and its pickoff finger mechanism 235 having completed their initial operation of removing the label 120 from the backing 121, and disposing it upon the wire 310, the switch pin or arm 291 of the switch 286 will have been released from the label leading edge for spring biased movement to normal switch-closed position, and the card feeding unit C will be permitted to automatically move the backing 121 forwardly, as hereinbefore described, until the leading edge of the next label 120 causes the switch pin or arm 291 to be moved to switch-open position and stop the motor 150 of the card feeding units C.

The mechanism comprising the elements 252–258, inclusive, provides a booster mechanism which provides extra pressure as the label 120 is placed on the wire by the pickoff finger mechanism 235 and has particular application during wrapping operations, as will later be explained. Thus, the roller 252 will ride upon the upper cam surface of crank 246 and the spring 256 will cause the lever or crank 253 to force the roller 252 downwardly on the link 245 to add the extra pressure necessary to hold the label 120 in place. This action is essential when a wrapping attachment is used in the unit rather than the flagging attachment, in order for the pickoff finger mechanism 235 to be removed from the area while the wrapping unit goes into action with the label held in place.

If it is desired to wrap on object with a label, wherein such object may be in the form of a wire 310, the pickoff finger mechanism 235 will take on the form of the embodiment shown in FIG. 18, wherein the stationary finger 236 is substantially identical to that of the previously discussed "flagging" embodiment. The movable pickoff finger 241 takes on the form of a protruding arm of a crank or lever 320 having a resilient pad 321 attached thereto for a more secure grip upon the label 120. The same link 243 is used for opening and closing the movable finger member 320 as heretofore described and the leaf springs for "flagging" are omitted. The pickoff finger embodiments are readily interchangeable by removing and replacing the screws 237. Assuming that the "wrapping" embodiment of the mechanism 235 of FIG. 18 is substituted for the "flagging" embodiment, the wrapping unit W will next be referred to.

*Wrapping unit*

It will be observed from FIG. 1 that the base B has been notched out to provide room for receiving an auxiliary support or base 322, which is arranged to slidably and pivotally support the wrapping unit W relative to the base B and the card feeding unit C and pickoff unit P stationarily positioned thereon. The auxiliary support 322 provides a pivot support portion 323 extending along the exterior side for hingedly supporting the upper platform 324 relative to the base B. The auxiliary support 322 is also slidable relative to the base B, and is provided with grooves 325 (see FIG. 19) at opposite ends each engageable with the threaded end of a screw 326. The screws 326 are provided with a knurled hand knob 327 and are arranged to threadingly engage a tapped opening in the base B for maintaining the auxiliary support 322 in adjustable fixed operating position relative to the base B. The auxiliary support or base 322, itself, rests upon spaced apart flange members 328 secured to the base B. Thus, upon manual release of screws 326 from contact with the grooves 325, the auxiliary base 322 will be free for sliding adjustment relative to the base B. As shown in FIG. 1, appropriate positioning indicia 329 are provided to mark the desired operating position. For instance, the wrapping unit W is shown in position, in FIG. 1, relative to the base B for "flagging" operation and is so spaced from the pickoff unit P to provide a means of applying a label one-half inch in length to an object, such as wire 310, as previously discussed. Relative movement of the auxiliary base 322 outwardly of base B, will position the unit W for operation with a longer label to be flagged to a wire, such as a label of three-quarter inch length. The first indicia marking, with the wrapping unit W being moved inwardly towards base B positions the unit W for wrapping operation. The sliding procedure merely moves the wrapping unit inwardly or outwardly relative to the operation of the pickoff finger mechanism 235.

As previously mentioned, the auxiliary base 322 also provides for the wrapping unit W to be pivotally supported, which support provides a further adjustment for positioning an object 310 to be labeled relative to the operation of the pickoff finger mechanism 235. Thus, with reference to FIG. 19, it will be observed that a tension biasing spring 332 is provided to normally urge the platform 324 downwardly on its pivot 323 relative to the upper surface of the base B. Pivotal adjustment is provided by means of an adjusting screw 333 threadingly engaging the upper platform 324 and contacting, at its end, the upper surface of the auxiliary base 322. A knurled end knob 334 is provided on the screw 333 for manual adjustment. The screw 333 is further provided with a worm portion 335 at its upper end, for purposes of actuating a worm gear 336 which, as shown in FIG. 1, is merely arranged to rotate a thicknes indicating dial 337 which establishes, with reference to a fixed point, the desired pivotal position of the auxiliary base 322. The pivotal adjustment as determined by means of either measuring the diameter or width of an object to be labeled, such as a cylindrical glass vial, or a wire. Thus, the markings on the dial 337 may be calibrated to correspond with such dimension, or preferably as shown, may be provided with an alphabetical setting arrangement. Thus, the gauge G (see FIG. 1) is provided with V-shaped openings 338, which because of their oppositely diverting surfaces, may be adapted to measure the relative thickness of the object to be labeled, and the position of the object within the V-shaped notches 338 is indicated by alphabetical markings. Positioning of the object 310 therein will establish which marking should be indexed on the dial 337 to provide the appropriate pivotal position responsive to turning the adjusting knob 334 in either direction.

The wrapping unit W is provided with a protective housing 340 secured at its lower end directly to the base 341 of a stationary upright support member 342, which support member provides the main support for the various operating components of the unit. As will be observed from FIGS. 1 and 19, the base 341 is slidably adjustable by means of the slots 343 (indicated by the dotted lines in FIG. 19) arranged to receive the adjustment screws 344.

An auxiliary jaw supporting member 345 and its base 346 are also laterally slidably adjusted by means of the slotted portions 347 in the base 346 which are arranged to receive the adjusting screws 348. Thus the upright support members 342 and 345 are laterally adjustable relative to one another and relative to the position of the pickoff finger mechanism 235, as desired.

As mentioned previously, the object to be labeled is preferably retained between slidable jaw members comprising the laterally spaced stationary jaws 305 and 306, which respectively cooperate with the slidably movable jaws 307 and 308 to grasp an object to be labeled therebetween. The cooperating jaw members 306 and 308 are each supported by support member 311 of the auxiliary support 345. The support member 311 is of L shape and provides an additional support means or a rotary solenoid member 350. The retractable jaw member 308 is arranged to slide relative to the stationary jaw 306 in the open ended slot 351 of the member 311, as indicated in FIG. 20. The action of the right hand jaw member 308 is mechanically independent of its laterally spaced left hand retractable jaw member 307 and operates only through the circuit actuating the rotary solenoid 350. The solenoid 350 is provided with an operating arm 352 secured to its shaft 353. The operation of the arm is shown in phantom view, and acts against the bias of a torsion spring 354 also positioned on the shaft 353. On operation of the solenoid 350, the arm 352 urges the slidable jaw member 308 towards the stationary jaw 306 by means of the action of the spring 355 and is held in place until the circuit is broken to the solenoid 350. The electrical circuit will hereinafter be described along with its operation.

As stated previously the left hand retractable jaw member 307 is independently actuated relative to the stationary jaw 305 and is supported by means of the laterally extending bracket 356 secured to a partially enclosed end of a hollow supporting spindle 357. The spindle 357 is preferably tubular to permit an object to be labeled, such as a continuous wire to be passed therethrough and exit at its opposite end. This arrangement is particularly useful when an object, such as a wire, is to be marked at axially spaced intervals and rewound in a roll for later separation and application. Spindle 357 is supported at its opposite end in a circular aperture of the upright support member 342, and serves to axially support additional operating elements, as will hereinafter be described. A radially extending mounting flange 358 is provided at the end of the cylindrical member 357 for supporting attachment to the support member 342 by means of the screws 359.

The left hand retractable jaw member 307 is also solenoid operated, but by means of a connecting solenoid actuated operating rod 360. The actuation of the retractable jaw 307 is specifically illustrated in the views of FIGS. 21 and 22, wherein the rod 360 is shown positioned in the bore of the hollow spindle 357 slidably supported by the inwardly directed flanged end of the spindle for movement in axially opposed directions therein. As shown in FIG. 22, the operating rod 360 provides an open ended, notched pivot support at its end for pivotally receiving an actuator link 361, pivotally fastened at its opposite end to a lever 362 at a point intermediate the end of the lever. One end of the lever 362 is pivotally supported from a stationarily supported shaft member 363 projecting laterally from the rear of the bracket 356. The opposite end of the lever 362 supports one end of an actuating spring 364, which is arranged to slidably actuate the retractable jaw member 307 in a manner not unlike that described in connection with the right hand jaw members. In this case the movable jaw member 307 slides in a slot 365 of the bracket 356, and normally rests against a stop 366. Thus, movement of the rod 360 to the right, as viewed in FIG. 22, will actuate the lever 362 by means of the link 361 to slide the movable jaw member 307 upwardly into engagement with the stationary jaw member 305 to retain the object therebetween. The spring 364 will act to urge the slidable jaw member 307 towards engagement therewith. Release of the solenoid actuated rod as hereinafter will be described, will permit the movable jaw 307 to be retracted to the position shown in FIG. 20.

The spindle 357 also serves as a bearing for supporting a revoluble flange sleeve 370. The flange of the sleeve 370 takes the form of a gear 371, which gear is arranged to be driven by a pinion 372 affixed to a shaft 373 (see FIG. 24), which shaft is supported by a bearing sleeve 374. The sleeve 374, in turn, is supported at one end by the upright support member 342, and the shaft 373 extends therethrough to support a driven gear 375 to rotate therewith. The gear 375 is arranged to mesh with a drive gear 376 affixed to the shaft 377 extending from the wrapping unit motor 378. Again, as previously described, all of the various motors used in the present labeling machine include constant braking means comprising the frictionally engaging discs 190 and 191, spring biased towards one another. The motor 378 is also of the low inertia type. The circuit to the motor will hereinafter be described. The motor 378 is reversible, and such characteristic is utilized in the wrapping unit W.

The flanged sleeve 370 is maintained from axial displacement relative to the spindle 357 by means of a resilient retainer clip 380 (see FIG. 2) engaging an annular groove in the member 357. The opposite end of the sleeve 370 bears against one side of the upright 342. Thus the sleeve 370 is free to rotate upon the stationary cylindrical supporting or bearing member 357 by means of the motor 378 and the intermediate gearing between the motor and gear 371 of the sleeve 370. This rotation provides the main wrapping movement of the label 120 upon an object such as the wire 310, through the medium of a polished, and preferably chrome plated, steel wrapping blade 382 disposed between the wire-holding jaw members 305, 307 and 306, 308. The blade 382 preferably extends in a perpendicular direction relative to an axially slidable support shaft 383, which shaft is slidably received in the bore of a tubular support member 384. Axial adjustment of the wrapping blade 382 between the jaw members is provided by means of the slot 385 in the tubular support member 384 and the set screw 386 received therein. The support member 384 is in turn rotatably supported upon a laterally extending pin (not shown) secured to the flanged gear 371 and positioned radially inwardly of the gear teeth. Thus the support member 384 and the wrapper blade 382 will follow the general rotation of the gear 371, and in addition, are further rotatable relative to the gear 371 by camming means, hereinafter described.

Thus, with reference to FIGS. 2 and 19, it will be apparent, that the torsion spring 387 is provided to normally urge the tubular support member 384 in a counterclockwise direction relative to FIG. 2, which rotational direction is varied by means of the contact between an inclined cam surface of a cam member 388 engageable with a roller type cam follower 389 mounted upon a shaft 390 affixed to the tubular support member 384, as shown in FIGS. 2 and 25, hidden from view in FIG. 19. The shaft 390 is fastened to the member 384 by means of an adjustable clamp 391 and extends radially from the support member 384. The torsion spring 387 is anchored at its opposite end to a pin 392 extending from the gear 371. Thus, the tubular support 384 and its wrapping blade 382 will be caused to rotate independently of the main rotation of the flanged gear 371 by means of contact with the cam 388 and the cam follower 389 protruding therefrom.

The cam 388, actuating the ancillary rotational movement of the elements 382 and 384, protrudes through an aperture 393 in the flanged gear 371, and is secured to an annular pivotally supported lever member 394, shown more clearly in the views of FIGS. 24 and 25. The lever 394 is pivotally supported to a trunnioned bracket 395. The annular lever 394 is positioned circumjacently of the sleeve member 370 and is of such internal dimension as to clear the external diameter of the sleeve as the lever is rocked on its pivot. Thus, as the lever 394 is pivotally actuated, in opposed directions relative to the gear 371, the cam 388 will be moved inwardly and outwardly of the aperture 393 to actuate the roller or cam follower 389. The lever 394 is biased in a direction away from the gear 371 by the action of the torsion spring 387 acting upon the cam follower 389, which in turn bears against the cam 388.

Pivotal motion of the lever 394 against the bias of the spring 387 is provided by means of the cam track 396 (see FIG. 23) mounted on an elongated lever 397, pivotally attached to trunnions 398 supported by the upright support member 342 and the base 341. As shown in FIG. 19, a spring 399, anchored to the support members 342 at one end, is also anchored to the lever 397 to urge the lever in a counterclockwise direction about its pivot 400 relative to the view of FIG. 19. A cam follower 401 protruding inwardly from the lever 394 (see FIGS. 19 and 24) is arranged to ride upon the cam surface of the cam track 396 to permit the lever 394 to act against the normal urging of the spring 387. Adjustment of this motion may be made by rotating the cam track 396 relative to the lever 397 upon positioning in selected circumferentially spaced openings 402 in the lever 397, disposed concentrically of the axis of the spindle 357. The lever 397 is prevented from its normal counterclockwise movement about its pivot by means of a hinged stop member 410 having a notched shoulder portion 411 normally engageable with a protruding portion 412 of the lever 397. Oppositely extending ears 413 having a cammed surface at the bottom thereof are provided at the outer end of the lever or stop 410 and are arranged for engagement with an inwardly extending pin 414 protruding from the gear 371. The pin 414 may be disposed in any of selected circumferentially spaced openings 415 of the gear 371 to provide an adjustment for various types of wrapping procedures. Thus, on contact between the pin 414 and the stop or lever 410, the stop 410 will be raised to the position shown by the phantom lines in FIG. 19 about its pivot 416 to release the protruding portion 411 of the lever 397 and permit the spring 399 to cause the lever 397 to rock in its counterclockwise direction to its phantom position shown in FIG. 19. The stop 410 is pivotally attached to the upright support member 342. Thus, upon action to be later described, the lever 397 will be permitted to be retracted away from the cam follower 401 on the lever 394 to permit the wrapping blade 382 to remain in a selected position relative to the object to be labeled. In addition, the lever 397 is actuated by means of the same solenoid actuating the jaws 305 and 307 as shown in FIG. 19, wherein a marginal edge of a laterally extending bracket member 420 mounted at the rear of the lever 397 is engageable with one end of a pin 421, which is transversely disposed relative to a crank 422 mounted on a shaft 423 of a rotary solenoid 424. The opposite end portion of the pin 421 is engageable with a slotted saddle bracket 425 affixed to one end of the jaw operated rod 360. The opposite arm of the crank 422 is attached to a spring 426 having its opposite end anchored to a stationary upright support 427. The spring 426 normally urges the crank 422 in a clockwise direction relative to FIG. 19, the solenoid acting to rotate the crank 422 in the counterclockwise direction upon actuation thereof.

The flanged gear 371 is further provided with cam lobes 430 and 431 (see FIG. 24), which cam lobes are adjustable circumferentially of the flange gear 371 by insertion of the mounting nut and bolt assemblies 432 in selected openings 415. The cam lobes 430 and 431 are of the external type and are arranged to contact the cam follower or roller 433 attached to a switch actuating lever 434 for a switch 435, as will hereinafter be described.

Before describing the action of the wrapping unit W, it is thought best for simplicity of description and illustration, to first describe the electrical circuit controlling the various units of the present labeling machine, and this may be done with particular reference to the diagrammatic view of FIG. 29.

*Electrical circuit components*

As stated previously, the automatic labeling machine of the present invention comprises a number of separate and independently operable cooperating units having no mechanical connection with each other, but which are interlocked electrically to perform their respective functions in the desired sequence, and are prevented by the electrical interlocks from operating except in that sequence, regardless of the action of the machine operator. Because of the absence of mechanical connection between the various units, the operation of the machine may be varied at will by simply changing the positions of electrical switches in the electrical unit; no mechanical changes being necessary. For example, the mere manual flipping of a toggle switch will cause the wrapping mechanism to make an additional 360° turn in wrapping a marker around a wire, as will hereinafter be described.

An unusual and unique feature of the machine lies in the method of furnishing power to operate the several units. This is done, as previously mentioned by electrical motors of the servo type. Each of the motors 150, 212 and 378 have rotors of relatively small diameter and of very little weight, and therefore, very little inertia. In addition, the motors have the characteristic of developing maximum torque at zero speed, which is contrary to the normal situation found in many motors used for industrial machines. The preferred motors are two phase, alternating current, induction motors, operated on a single phase alternating current line, by transferring the current in one winding out of phase with the other by means of capacitors. This is illustrated in FIG. 29 with reference to the capacitors 450, 451 and 452 inserted serially between the winding circuits of the motors 150, 212 and 378, respectively.

When the labeling machine is at rest and with the master switch S in circuit closed position, as shown, and with the safety switch 300 being closed upon closure of the cover or housing 298, none of the motors will be running, and the machine is completely inoperative. A foot operated switch 453 may then be pressed to close the circuit to the pickoff unit motor 212 to operate the pickoff finger mechanism 235. As hereinabove described, the pickoff finger mechanism 235 then acts to remove a label 120 from the dispenser backing 121 and places it upon the object such as the wire 310 or other object to be marked.

This unit will then come to rest. The motor 212 does not coast past the "rest" position, but stops almost instantly because of its low inertia. For this reason no clutches or mechanical disconnects are required here or in any of the other units.

Before the pickoff mechanism comes to rest, it activates the motor 378 of the wrapping unit W, which operates to wrap the label around the wire 310. The motor 378 reverses during its rotation; the reversal being instantaneous due to the characteristics of the motor. Again, as the pickoff finger mechanism 235 reaches rest position, it activates yet a third servo motor 150, which moves the dispenser backing 121 to align the label 120 next in line into position to be picked off.

Apart from the mechanical convenience afforded by the preferred motors, an important safety feature also is involved. A dramatic safety demonstration may be given by inserting a finger or hand into almost any part of the mechanism during operation. The mechanism, including the motor, comes to a stop without damage to itself or the person concerned. The motor may remain stalled for five or ten minutes should one care to wait that long. As soon as the finger or other object is withdrawn, the machine will finish the cycle from where it left off. The explanation, of course, lies in the low inertia of the respective motors. A conventional type of motor with less power could cause injury and damage because of the energy stored in the heavy rotor. Thus, the present invention contemplates a design of safety features into the basic mechanism, rather than is so often the case to build a relatively dangerous machine and then surround it with safeguards.

Power to the labeling machine is provided from a conventional single phase, alternating current line through the master switch S to the power supply lines 460 and 461. Indicator light I is connected across the lines for continuous operation when both the master switch S and the safety switch 300 are in closed circuit position. Both of the power lines 460 and 461 are fed to a full wave bridge rectifier 462 through a fuse 463 for purposes of supplying power for use in the various solenoids connected thereto. The alternating current is supplied directly to the motors 150, 212 and 378 from the line 460 through the respective branches 464, 465 and 496. Branches 467 and 468 connect the reversing motor 150 with the card feed override switch buttons 184 and 185, respectively, for providing forward or reverse motion to the dispenser card 120 and the card feeding unit C. As indicated, the switch button 184 is for reverse feed and the button 185 is for forward feed. It will be noted that upon circuit closure to either of the feed buttons 184 or 185, current will be supplied to the normally closed switch 295, from the branch circuit 470 to the normally closed switch 286, which is the label-sensing switch actuated by the engagement of the leading edge of the labels 120 with the pin 291 as the backing 121 moves in a forward direction. It is to be noted that substantially all of the switches utilized in the present device include a parallel arc suppression circuit, indicated by the reference character A, to prevent arcing when the contacts are opened. The arc suppression circuits are of conventional design comprising balancing capacitor and resistor units.

It is to be noted that the switch buttons 184 and 185 also act to motivate the switch arms of switches 471 and 472 respectively. Thus, as the push buttons or manual card feed control buttons are override buttons, they will cause the switch contacts 471 and 472 to be moved to their alternate position upon pressure of either button 184 or 185 to supply current by means of conductor 473 to the coil of the solenoid 292 for retraction of the label-sensing switch 286 with the switch arm 291 being retracted from physical contact with the labels 120, and the member 293 (see FIG. 2a) will be seated in contact with the permanent magnet 294 to hold the switch 286, in the retracted position. Thus, when the lever 293 is in its rotated position against the magnet 294 (not shown) it will cause the normally closed switch 295 to be moved to its open circuit position to interrupt the circuit from branch 469 to the switch 286. It is also to be noted that the switch contacts 471 and 472 are further arranged to complete the circuit through the branch line 474 to the coil of the solenoid 183, which will be recalled to be the solenoid actuating the angular adjustment of the card feeding pinions 169, 170 and 171 upon reversal of the direction of the dispenser backing 121 positioned therebetween.

The circuit to the card feeding motor 150 is completed through the branch lines 467 and 468 to the switches 184 and 185, respectively, and thus to the return line 461 through branch 475.

The alternate branch circuit from the motor 150 through branch conductor 469 to the switches 295 and 286 is completed through the switch contacts of the switch 282 found at the rear of the pickoff unit slides 371 and 272 and actuated by the single switch arm 283. The circuit is completed through the switch 282 to the return line 461 from the branch 476. As stated previously, a circuit is established to the pickoff unit motor 212 from the line 460 through the branch 465, and from the motor to the branch 477 to the normally open circuit, foot pedal operated switch 453 to the line 478 to a contact of a stepping relay 480, which includes a series of stepping circuit contacts comprising a non-bridging top bank 479 of the stepping relay 480. The lower bank, indicated by the reference character 482, is of the bridging type and is a so-called "homing" bank. Thus, on actuation of the top bank 479 of the relay 480, the circuit to the return line 461 will be completed through the line 483.

The D.C. rectifier 462 provides a power supply to the various solenoids from its branch 484; for instance, to the branch 485 supplying the switches 471 and 472 for operation of the respective solenoids 183 and 292.

The branch line 477 emanating from the motor 212 also connects with a conductor 486 leading to the switch 282 and return through the branch line 466 to the power line 461. The branch line 487 from rectifier 462 supplies one side of the normally closed switch 281, which is also located at the rear of the slides 231 and 272 of the pickoff unit P, to supply current to the solenoids 350 and 427 from the line 488, which solenoids are arranged to actuate the retractable wire holder jaw members 307 and 308, as heretofore described. The remaining branch 489 emanating from the rectifier line 484 supplies D.C. current to the normally open, off-normal contacts 495 and 515 of the stepping relay 480, the other side of contact 495 supplying the solenoids 350 and 427 to hold closed the wire holder jaws 307 and 308 until completion of the wrapping cycle.

The motor 378 of the wrapping unit W is connected to the power line 460 from the branch 496. Branch lines 497 and 498 respectively complete the circuit from normally closed switch 499 and the normally closed switch 500 to the motor 378. Both switches 499 and 500 are interrupter contacts of the stepping relay 480 and provide arcing protection for the top bank fingers of said relay. The opposite side of the switch 499 connects with branch line 501, which terminates at its opposite end in a variable resistor 502, which resistor controls the reverse speed of the motor 378. The opposite side of the switch 500 terminates in the variable resistor 503 through branch conductor 504, which controls the forward speed of the motor 378. The variable resistor 502 is in series connection, through branch line 505, to a manually operated double pole, double throw toggle switch 506 located on the panel of the separate electrical unit (not shown) for control by the operator. The resistors 502 and 503 are shown in FIG. 29 set for fast wrap operation in both reverse and forward directions of motor 378.

A branch conductor 507 connects the variable resistor 503 with a group of serially connected contacts 479a of the top bank 479 of the stepping relay 480. Another double pole, double throw toggle switch 508 is connected, through a second branch conductor 509, to the variable resistor 503 and also with the contacts 506a and 506b of switch 506. Switch 506 controls the circuit for establishing either a reverse or forward wrapping operation and is shown in forward wrap position. Switch 508 controls the circuit establishing a short wrap or a long wrap duration, and is shown in short wrap circuit position, with contact 508a open and 508b in closed position.

There is also provided on the panel (not shown) of the electrical unit a single pole, single throw, toggle switch 510, which is manually controlled to change the machine sequence alternatively from "wrapping" (circuit closed position) to "flagging" position (circuit open position). The switch 510 is connected at one side to the switch 280 through the conductor 511, which switch is located on the side of slide 272 actuated by cam 278, and which acts to start the stepping relay 480. The opposite side of the switch 280 is connected by means of branch line 512 to one side of switch 435, actuated by the cam lobes 430 and 431 on the gear 371, which acts through branch 514 to complete the circuit to the normally open, off-normal contact 515 of the stepping relay 480, which latter contact opens the stepper actuating circuit at the end of the cycle. A half wave rectifier 517 supplies D.C. current for the stepping relay, and is supplied from the power conductor 461 through a fuse 518. The opposite side of the toggle switch 510 is connected to the rectifier 517 through the conductor 519 at the positive pole on the D.C. side of the rectifier which is a common terminal also connected with the branch conductor 516 as previously mentioned. The rectifier 517 is further connected through branch conductor 520 to provide spark suppression for the "homing" contacts (lower bank 482) of the relay 480. The stepping coil 521 is connected through conductor 522 to one side of the coil of relay 523, which provides stepping on impulse. Another branch conductor 524 supplies current from rectifier 517 to the lower bank 482 of the stepping relay 480. The upper bank 479 of the stepping relay 480 is supplied directly from the conductor 461. The contacts of the upper bank 479 are also connected by means of branch conductors 525 and 526, to the contacts 508a of the switch 508 and to the variable resistor 503, respectively.

The contacts of the lower bank 482 of the stepping relay 480 are respectively supplied by branch circuits 527, 528, 529 and 530 to the toggle switches 506 and 508 for providing circuit variations as desired. Another branch conductor 531 of the lower bank 482 connects the bank with one side of a set of "homing" contacts 532 of the stepping relay 480. The interrupter contacts 532a are connected, through branch line 533, to the contacts of relay 523, and cooperating with this relay to provide stepping on impulse. The contacts of the relay 523 are further connected to the stepping coil 521 through branch 534 and through branch 535 to one side of the switch 280.

To complete the circuit, it is to be noted that the rectifier 462 supplies current from the branch conductor 536 to solenoids 183 and 292 and through the branch conductor 537 to the solenoids 350 and 427. The label-sensing switch 286 is connected through conductor 538 to the switch 282.

Operation of the entire labeling machine with relation to its electrical circuit will next be described.

When the master switch S is actuated towards circuit closed position and a dispenser backing 121 is inserted in the card feeding unit C, the backing 121 is moved along the groove 102 by means of the cooperating knurled wheels 166, 169; 167, 170 and 168, 171, until the leading edge of the first label 120 activates the switch blade or pin 291 of the switch 286, which switch is normally closed, and when opened by the leading edge of the label 120, acts to shut off the motor 150 of the card feeding unit C, arranged to drive the knurled cooperating wheels. The labeling machine is now ready to apply a label 120 to an object such as an insulated wire 310.

Assuming that a wrapping operation is to take place, the foot operated switch 453 will be depressed to closed position, supplying current to the motor 212 operating the pickoff unit element. This motor drives the pickoff finger mechanism 235 forward, as previously described, which motion concurrently actuates the switches 281 and 282. One side of switch 282 is connected in parallel through conductors 486 and 477 with the foot operated switch 453, so that if the foot switch is now opened, the motor 212 will continue in its operation to the end of its cycle. The same side of the switch 282, as it closes the circuit to the motor 212, opens the circuit to the card feed motor 150 through the normally closed switches 286 and 295 and their respective branch conductors. Since this actuation occurs just before the label 120 is removed from the backing 121, it temporarily prevents the card feeding unit C from moving the next label 120 into pickoff position, even though the label-sensing switch 286 detects the removal of the first label and closes its part of the circuit to the motor 150 of the card feeding unit C. This circuit must stay open until the pickoff finger mechanism 235 has returned to "rest" position and the fingers 236 and 241 have been opened to allow the new label to move into position therebetween; otherwise, the pickoff fingers would collide with the label upon their return to "rest" position.

It will be apparent that upon return to "rest" position the pickoff finger mechanism 235 reverses the actuation of switches 281 and 282, at the rear of the slide members 231 and 272, to complete the circuit to the card feeding motor 150, which then moves a new label into position, stopping at the label-sensing switch 286, which detects that the label is correctly lined up with the pickoff fingers, by contact with the switch arm 291.

The switch 282 as previously mentioned, is a double throw, double pole switch. Thus far, only the action of one side of the pair of concurrently operated switches has been described. The other side (comprising switch 281 contacts), as the cycle starts, is employed to operate the two rotary solenoids 350 and 427, which close the two wire movable jaws 307 and 308 of the wire-holder jaw unit.

As the pickoff finger mechanism 235 approaches the end of its cycle, it actuates switch 280. (This is a one-way switch, and therefore was not actuated as the pickoff mechanism 235 came in contact with it at the beginning of a cycle.) As the switch 280 closes, it actuates the stepping relay 480 through the relay 523, causing it to move one step and thereby start the cycle of the wrapping unit W.

As the stepping relay 480 moves in its first step, it closes two circuits and opens one. The circuit to the wrapping unit motor 378 is closed to thereby start the wrapping cycle. The circuit to the wire-holder jaws 307 and 308, which has previously been closed by switch 281, but which circuit was about to be opened again by that same switch as the cycle of the pickoff mechanism 235 is completed, is further closed by a pair of normally open contacts on the stepping relay, comprising switch 495, and which are in parallel connection with the contacts of switch 281, thereby continuing to hold the movable jaws 307 and 308 closed through the wrapping cycle. The circuit to the foot switch 453 is opened, so that if the foot switch has been held closed, or if it is pressed again too soon, the pickoff finger mechanism 235 will not begin to cycle until the wrapping cycle has been completed. Thus, it will be seen that if the operator closes the foot switch 453 and holds it closed continuously, the several units of the machine will continue to cycle in their proper order, applying and wrapping each label on top of the last.

The first short stroke of the normal wrapping cycle is in a counterclockwise direction, which is illustrated in the diagrammatic view of FIG. 26 and which moves the wrapping blade to phantom position A with the blade 382 substantially horizontal and spaced above the object 310. As the rotation continues, the blade assumes position B with the blade contacting the object, and at the end of this stroke, the wrapping mechanism W will actuate switch 435. The switch 435 is in series connection with switch 280 (the one-way switch at the side of the slides which provided the impulse for the first step of the stepping relay 480), and the circuit of the switch 435 is routed through a pair of contacts 523a on the stepping relay 523 in such a manner that the circuit of this same switch is opened when the stepping relay 480 is in "rest" position, whereas the circuit of switch 280 is not. The net effect of this arrangement is that switch 435 cannot actuate the stepping relay 480 until after the relay has made its first step. This is important because switch 435 must be in closed position when the labeling machine is at "rest"; also because the wrapping mechanism W often is moved by hand, which would otherwise start the stepping relay 480 if the circuit of switch 435 were not open.

As switch 435 is actuated by the wrapping mechanism at the end of the first short counterclockwise stroke, the stepping relay 480 is caused to move to a second step. This alters the circuit of the wrapping mechanism motor 378, so as to reverse this motor, thereby reversing the rotation of the wrapping unit W. Because of the characteristics of the motor 378, this reversal occurs during this rotation, and is instantaneous.

With reference to FIG. 26, the short clockwise stroke now occurs, to position the wrapping blade 382 at the phantom position C, at the end of which the wrapping mechanism W again actuates switch 435, causing the stepping relay 480 to take a third step and thereby restore the original direction of rotation of motor 378. As the wrapping mechanism W rotates, switch 435 is actuated twice for each 360° of rotation, and the stepping relay 480 moves one step each time the switch closes. After a predetermined number of steps (depending on how much rotation is desired), the stepping relay 480 "homes" to "rest" position by means of its "homing" contact 532, thereby cutting off the current to motor 378, bringing the wrapping mechanism W to a stop at a predetermined point. As stated previously, the switch 435 is actuated by the positioning of the cam lobes 431 upon the gear 371, which may be varied by inserting the nut and bolt assemblies 432 in selected openings 415 of gear 371.

As the stepping relay 480 arrives at its "rest" position, it opens the circuit to the wire-holder jaw solenoids 427 and 350, and switch 281, which also actuates the solenoids, and which switch has already been opened; therefore, the wire-holder jaws 307 and 308 open and release the wire 310 or other object which has been held therebetween. At the same time, the stepping relay 480 closes the circuit to the switch 453 making it possible to initiate a new cycle in the improved labeling machine.

Two variable resistors 502 and 503 are provided to make it possible to vary the speed of the wrapping mechanism W in both the clockwise and the counterclockwise direction. Normal operation calls for a relatively slow movement clockwise, and a relatively fast movement counterclockwise, but the combination can be varied to suit particular requirements.

The three toggle switches 506, 508 and 510 are provided as a means of varying the wrapping cycle. The variations may be made as follows:

(1) A short, slow wrap in one direction to stick down the tab of label 120, followed by approximately 1½ turns in the opposite direction, at higher speed.

(2) Same as above, except that the final wrap is 2½ turns instead of 1½ turns.

(3) Same as variation (1) above, except all wrapping is in one direction.

(4) Same as variation (2) above, except all wrapping is in one direction.

(5) No wrapping cycle at all. This cycle is completely eliminated when labels are to be "flagged" onto wires.

In order to accomplish these variations, the switch 508 provides short and long wrap variations through the stepping relay 480 to the motor 378 and the switch 506 provides the reverse and forward wrapping variations through either of the selected variable resistors 502 or 503, also controlling the lengths of operating cycle. The switch 510 provides the variation between wrapping and flagging. Each of the wrapping cycle variations take place with switch 510 in closed circuit position, as shown in FIG. 29, through the stepping relay switch 280. Circuit open position of the switch 510 which is manually controlled by means of a toggle lever mounted on the electrical unit (not specifically shown), provides a means of taking the stepping relay out of the wrapping unit control circuit. Thus, the movable jaws 307 and 308 are caused to operate as above described, but the wrapping unit motor 378 will remain in non-rotative position.

Thus to obtain variation No. 1, recited above, the toggle switch 508 will be moved to a "short wrap" position, with the circuit to the contacts 508a being open, as shown, and the switch 506 will be manually actuated to a "reverse" position, with the circuit to contact 506a being closed. The switch 510 is closed to "wrap" position, as indicated in FIG. 29.

Variation No. 2 may be obtained by placing the switch 510 in the closed circuit or "wrap" position and switch 508 in the "long" wrap position with contacts 508a being closed, and switch 506 in "reverse" position with contacts 506a being closed.

Variation No. 3 is obtained by placing switch 510 in the "wrap" position and switch 508 in the "short" wrap position with contacts 508a being open as shown, and switch 506 in the "forward" position with contacts 506b being closed, as shown. The circuit of FIG. 29 is shown set for this variation.

Variation No. 4, providing all wrapping in one direction, is obtained by placing switch 510 in "wrap" position and switch 508 in "long" wrap position with contacts 508a being open, and switch 506 being positioned in its "forward" position with contacts 506b closed, as shown.

As mentioned previously, to obtain variation No. 5, switch 510 is moved to its circuit open position.

With the electrical sequence of the wrapping unit W explained, it is now deemed desirable to describe the sequence of mechanical operation of the wrapping unit elements. For purposes of description, it is assumed that the toggle switches 506, 508 and 510 are set for the first variation of a short, slow wrap in a first direction, followed by a wrap of approximately 1½ turns in an opposite direction at higher speed. The position of the switch contacts for the first variation are with contacts 506a closed, contacts 508a open and switch 510 closed.

Thus, the solenoid 424 which operates the left retractable jaw 307 also operates a mechanism which allows the wrapping blade 382 to be lowered onto the wire 310, or other object to be labeled, and raises it again upon completion of the cycle. As the wrapping blade begins its cycle, it clears the short end of the label protruding above the axis of the wire 310, with reference to FIG. 26; and then is lowered gently through the operation of the cam follower or roller 389 riding down the surface of the inclined cam 388. The cam 388 is at this time protruding through the aperture 393 of the gear 371, inasmuch as the lever 394 is held against the gear 371 by means of contact between the protruding pin 401 with the flat surface of the lobe 396 of lever 397, as shown in solid lines in FIG. 25. The lever 397 is maintained in place by the stop 410, against the bias of the spring 399 as shown in FIG. 19. The solenoid lever 422 will have been moved counterclockwise relative to the FIG. 19 position to permit the lever 397 to move to the phantom line position of FIG. 19 upon release of the stop lever 410.

Thus, the inclined cam 388 will be retracted from the aperture 393 and away from the cam roller 389 as the gear 371 rotates under the influence of the torsion spring 387, which is also urging the tubular support member 384 and the wrapping blade 382 to rotate about the axis of the tubular support member. The cam motion of withdrawal is supplied by the inclined portion of the cam lobe 396 as the lever pin or cam follower 401 rides downwardly thereof.

As the blade 382 comes into contact with the label 120 (position A of FIG. 26), the latch on stop lever 410 is opened by the contact of the pin 412 on the inner side of gear 371 with the cam ears 413 of the lever 410 to permit the spring 399 to retract the lever 397 out of contact with the pin 401 and thereby withdraw cam 388 from the aperture 393, out of contact with the follower 389, as shown in phantom view of FIG. 25. The direction of the motor 378 will be reversed by reason of contact of the cam lobe 430 extending from the gear 371 with the rolls 433 of switch blade 434 of switch 435 controlling the reversing action as heretofore described. Thus, as the direction of rotation of the unit is reversed, the cam 388 will be out of range of the follower 389; therefore, the wrapping blade 382 will not be lifted from the label in its further action as shown by the dotted line path of FIG. 24.

At the conclusion of the cycle the solenoid 424 will be de-energized as discussed above and the spring 426, acting upon lever 422 will cause the lever to return the lever 397 to its original position, as shown in the solid lines of FIG. 19. This action causes the inclined cam 388 to return to its original position and lift the blade 382 from the label 120. The solenoid 424 will also concurrently act to open the left retractable jaw 307 by means of the operating rod 360. The right jaw 308 will also be opened at the same time by solenoid 350 upon opening of switch 281.

The operation of the cam and follower described above is an important feature in that it provides a gentle lowering of the wrapping blade onto the label and the object being labeled, while holding it completely out of engagement with the object at the beginning of the cycle. This is especially important in the labeling of delicate objects such as transistors, glass vials containing radioactive materials, etc.

The construction of the wrapping unit is such that a great variety of motions may be obtained, so that labels may be applied to flat or curved surfaces, as well as wrapped around a circumference. The spindle is hollow, providing a passageway for a continuous wire if it is desired to run such a wire through and mark it at regular intervals.

As mentioned above, it is often desirable to move the dispenser backing 121 back and forth manually, in order to select a particular label, or to remove the backing 121 and substitute a different one. This is accomplished by pressing the feed or override buttons 184 and 185, wherein the button 185 moves the backing 121 to the left as viewed in FIG. 3 and button 184 moves the backing 121 to the right. As either of these buttons is pressed, the solenoid 292 retracts the label-sensing switch 286, and latches it in retracted position by means of the magnetic latch 294. This permits the dispenser backing 121 to be moved backward and forward without interference between the switch 286 and the labels 120. The label-sensing switch 286 will remain retracted until the labeling machine is cycled, when it automatically returns to normal position and resumes its job of sensing the leading edge of the label 120 next in line.

In retracted position, the label-sensing switch 286 would ordinarily furnish current to the motor 150 of the card feeding unit C continuously, if the circuit were not opened at another point. Therefore, as this switch is retracted and the switch arm clears the edge of the label, the solenoid 292 retracting mechanism opens a second switch 295. Switch 295 remains open until the sensitive switch 286 is returned to normal position; therefore, no current is supplied to the motor 150 except through the manual override buttons 184 and 185.

The function of the solenoid 183 is important, as previously stated, in serving to reverse the angle of the narrow wheels 166, 169; 167, 170 and 168, 171, which serve to drive the dispenser card 121 in the backing feeding mechanism C when the backing 121 is moved to the right by pressing switch 184. This action keeps the bottom edge of the backing 121 firmly down in the groove 101 whether it is being moved to the right or to the left. The small relay 523 is a normal accessory to the stepping relay 480. As previously stated, the additional capacitors and resistors are electrically connected and each of the switch units are employed in conventional fashion to reduce arcing at the switch contacts.

The electrical unit is not specifically illustrated, but consists of dust-tight box connected to the main base B of the labeling machine by means of a multi-conductor cable M (see FIG. 1) utilizing a conventional twist type lock connector 540. The box for the electrical unit contains the stepping relay 480, the small relay 523, the rectifiers 462 and 517, the fuses 463 and 578 and all of the resistors and capacitors, including the capacitors for the two-phase motors 150, 212 and 378. This arrangement has the effect of cleaning up the machine and also makes it possible to keep the machine going simply by changing electrical units if maintenance to their components should be required. On the aforementioned dust-tight box are located the toggle switches 506, 508 and 510, and the connecting cable M is preferably made long enough to permit the electrical unit to be placed under a bench while the main components of the labeling machine mounted on the base B are located on the top.

I desire it to be understood that this invention is not to be limited to any particular form or arrangement of parts except in so far as such limitations are included in the appended claims.

I claim:

1. An automatic labeling machine adapted for removing and transferring a label adhering to a backing from said backing to an object to be labeled and applying the label to said object, said machine comprising a support member for said object; label removing means comprising releasable cooperating clamping fingers arranged to clampingly engage the remaining non-adhering portion of said label and remove the label from said backing; a card feeding unit for aligning said clamping fingers and said backing relative to one another for removal of said labels therefrom; label applicator means arranged for permanently affixing said label to said object; sliding transfer means cooperating with said fingers and arranged for transferring said removed label to said object prior to permanent application thereof by said label applicator means; and sequential control circuit arranged for motivating said aforementioned means in selected operating sequence.

2. An automatic labeling machine adapted for removing and transferring a label adhering to a backing from said backing to an object to be labeled and applying the label to said object, said machine comprising a support member for said object; label removing means comprising releasable cooperating clamping fingers arranged to clampingly engage the remaining non-adhering portion of said label and remove the label from said backing; a card feeding unit for aligning said clamping fingers and said backing for removal of said labels therefrom; label applicator means including a wiping blade having a label contacting surface and arranged to wipe said surface across said label for permanently affixing said label to said object, said applicator means arranged to cause said wiping blade to follow the contour of said object; sliding transfer means cooperating with said fingers and arranged for transfering said removed label to said object for initial engagement therewith prior to permanent application thereof by said label applicator means; and an electrical sequential control circuit interconnecting each of said aforementioned means and arranged for motivating said means in selected operating sequence.

3. An automatic labeling machine adapted for removing and transferring a label from an adhering backing to an object to be labeled and applying the label to said object, said machine comprising a support member for said object; label removing means arranged to mechanically engage and remove labels from said backing; a card feeding unit for aligning said label removing means and said label-support member for removal of said labels therefrom; label applicator means arranged for permanently affixing said label to said object; sliding transfer means cooperating with said label removing means and arranged for transferring said removed label to said object for initial engagement therewith prior to permanent application thereof by said label applicator means; mechanism for operating said transfer means comprising an eccentric rotatable drive cam member having external cam surfaces and followers operatively guiding said sliding transfer means responsive to the rotative position of said cam member, and a balancing eccentric cam member providing cam surfaces in opposed camming relationship with said drive cam member, and biasing follower means normally urged in a direction towards said balancing cam surfaces and providing a torque component balancing the torque load on said drive cam; sequential control means arranged for motivating said aforementioned means in selected operating sequence.

4. An automatic labeling machine adapted for removing and transferring a label from an adhering backing to an object to be labeled and applying the label to said object, said machine comprising a support member for said object; label removing means arranged to mechanically engage and remove labels from said backing; a card feeding unit for aligning said label removing means and said backing for removal of said labels therefrom; label applicator means arranged for permanently affixing said label to said object; sliding transfer means cooperating with said label removing means and arranged for transfering said removed label to said object for initial engagement therewith prior to permanent application thereof by said label applicator means; sequential control circuit arranged for motivating said aforementioned means in selected operating sequence; and adjustable positioning means for adjusting the relative spacing between said label applicator means and said transfer means responsive to the external surface dimension of the object to be labeled.

5. A wrapping device for applying an adherable label to the peripheral surface of an object, and comprising a support member for said object; and a wiping blade having a label-contacting wiping surface and being positioned transversely relative to said object, said object and said blade being arranged for relative rotational wiping contact with one another; and rotational drive means operatively arranged to provide said rotative relative motion.

6. A wrapping device for applying an adherable label to the peripheral surface of an object, and comprising a support for said object; revoluble means substantially coaxial with the axis of said object when supported by said support; a wiping blade having a label contacting surface and being operatively associated with and supported by said revoluble means and extending transversely of said object and arranged to wipe said surface across said label after initial application of said label to said object; and drive means for said revoluble means.

7. A wrapping device for applying an adherable label to the peripheral surface of an object, and comprising a support for said object; revoluble means substantially coaxial with the axis of said object when supported by said support; a wiping blade having a label contacting surface and being operatively associated with and supported by said revoluble means and extending transversely relative to said object and arranged to wipe said surface across said label after initial application of said label to said object; drive means for said revoluble support; and control means arranged to selectively control the application of said blade to said label.

8. A wrapping device for applying an adherable label to the peripheral surface of an elongated object, and comprising means for releasably supporting said object; revoluble support means substantially coaxial with the axis of said object when supported by said releasable support means; a rotatable blade support member rotatably supported by said revoluble support and arranged to revolve therewith in a path radially spaced from said object; a laterally extending wrapping blade supported by said rotatable blade support member; blade biasing means arranged to urge said rotatable blade support means in a rotational direction relative to its axis for contact of said extending wrapping blade with said label subsequent to initially positioning of said label upon said object; reversible motor drive means for said revoluble support means; and cam operated control means for said blade biasing means arranged to selectively control the urging relationship of said blade biasing means with said rotatable blade support means, whereby rotation of said rotatable blade support means against the bias of said biasing means causes said wrapping blade to contact said label concurrently with the rotation of said revoluble support means and responsive to selected actuation of said cam operated control means; and an electric circuit including a cam operated adjustable switch actuator arranged to alternatively connect electric circuit components to said reversible motor for changing its rotational direction at selected intervals responsive to prepositioning of the cam operating said actuator.

9. Prime mover means for an automatic labeling machine having a plurality of sequentially operated components including label applicator means and label transfer means arranged for removing a label from a dispensable label-support element and transferring the label to an object to be labeled for application thereto by said label applicator means; said prime mover means including a servo type motor having a rotor of relatively small diameter and minimum weight and arranged to develop maximum torque at zero speed; a power supply for said motor; and continuously applied brake means for said rotor providing immediate stopping on interruption of said power supply.

10. Prime mover means for an automatic labeling machine having several sequentially operated components including label applicator means and label transfer means arranged for removing a label from a dispensable label-support element and transferring the label to an object to be labeled for application thereto by said label applicator means; said prime mover means comprising at least one electric motor having a rotor of relatively small diameter and minimum weight and arranged to develop maximum torque at zero speed; and a single phase, alternating current power supply for said motor; said motor being of the two phase, alternating current, induction type.

11. Prime mover means for an automatic labeling machine having several sequentially operated components including label applicator means and label transfer means arranged for removing a label from a dispensable label-support element and transferring the label to an object to be labeled for application thereto by said label applicator means; said prime mover means comprising at least one reversible servo type electric motor having a rotor of relatively small diameter and minimum weight and arranged to develop maximum torque at zero speed; a single phase, alternating current power supply for said motor; said motor being of the two phase, alternating current, induction type; and a constantly applied brake means for said rotor providing immediate stopping of said rotor on interruption of said power supply.

References Cited by the Examiner
UNITED STATES PATENTS

| | | | |
|---|---|---|---|
| 1,087,245 | 2/14 | La Blatt | 271—49 |
| 1,096,584 | 5/14 | Woodland | 156—481 XR |
| 2,201,207 | 5/40 | Schmidt et al. | 216—53 |
| 2,349,309 | 5/44 | Schmidt et al. | 216—53 |
| 2,414,937 | 1/47 | Elliott | 154—1 |
| 2,464,173 | 3/49 | Broadmeyer | 271—49 |
| 2,530,655 | 11/50 | Entwistle | 216—29 |
| 2,543,323 | 2/51 | Marsh | 216—30 |
| 2,560,301 | 7/51 | Morrison | 154—1 |
| 2,725,156 | 11/55 | Manas | 216—53 X |
| 2,802,598 | 8/57 | Petterson | 216—9 X |
| 2,814,269 | 11/57 | Stahr | 156—272 XR |
| 2,920,780 | 1/60 | Hauschild et al. | 216—9 |
| 2,922,540 | 1/60 | Krobath | 216—29 |
| 2,939,599 | 6/60 | Schulter | 216—9 |

EARL M. BERGERT, *Primary Examiner.*

JOSEPH D. BEIN, *Examiner.*

UNITED STATES PATENT OFFICE
CERTIFICATE OF CORRECTION

Patent No. 3,192,093 June 29, 1965

Frederic S. Tobey

It is hereby certified that error appears in the above numbered patent requiring correction and that the said Letters Patent should read as corrected below.

Column 2, line 8, for "sequence." read -- sequence, --; column 3, line 56, for '"T"' read -- T --; column 5, lines 33 and 34, for "threethrough" read -- therethrough --; column 7, lines 10 and 20, strike out "backing", each occurrence; column 8, line 65, before "flagging" insert -- a --; column 12, line 43, after "position" insert -- shown --; column 13, line 74, for "on" read -- an --; column 15, line 38, for "or a rotary" read -- for a rotary --; column 18, line 9, for "operated" read -- operating --; column 26, line 11, strike out "to drive the dispenser card 121 in the backing feeding" and insert instead -- to drive the dispenser backing 121 in the card feeding --.

Signed and sealed this 15th day of February 1966.

(SEAL)
Attest:

ERNEST W. SWIDER
Attesting Officer

EDWARD J. BRENNER
Commissioner of Patents